United States Patent
Malik et al.

(10) Patent No.: US 9,258,257 B2
(45) Date of Patent: Feb. 9, 2016

(54) DIRECT MEMORY ACCESS RATE LIMITING IN A COMMUNICATION DEVICE

(71) Applicant: QUALCOMM Incorporated, San Diego, CA (US)

(72) Inventors: Rahul Malik, Bangalore (IN); Aaditya Rai, Bangalore (IN); Samarjeet Banerjee, Bangalore (IN); Abhishek Rastogi, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 508 days.

(21) Appl. No.: 13/738,789

(22) Filed: Jan. 10, 2013

(65) Prior Publication Data

US 2014/0195630 A1    Jul. 10, 2014

(51) Int. Cl.
G06F 15/167    (2006.01)
H04L 12/861    (2013.01)
G06F 13/28    (2006.01)

(52) U.S. Cl.
CPC ............ H04L 49/9063 (2013.01); G06F 13/28 (2013.01)

(58) Field of Classification Search
CPC .......................... G06F 13/28; H04L 49/9063
See application file for complete search history.

(56) References Cited

U.S. PATENT DOCUMENTS

| | | | | |
|---|---|---|---|---|
| 5,892,968 | A * | 4/1999 | Iwasaki ................. | G06F 13/102 710/1 |
| 6,950,428 | B1 * | 9/2005 | Horst ...................... | H04L 45/00 370/389 |
| 7,793,295 | B2 | 9/2010 | Huang et al. | |
| 2004/0059828 | A1 | 3/2004 | Hooper et al. | |
| 2005/0038939 | A1 | 2/2005 | Lee | |
| 2007/0248086 | A1 | 10/2007 | Petersen | |
| 2012/0102299 | A1 | 4/2012 | Doerr et al. | |
| 2012/0163175 | A1 * | 6/2012 | Gupta .................... | H04L 47/10 370/235 |
| 2012/0166681 | A1 * | 6/2012 | Suzuki ................ | G06F 13/4295 710/18 |
| 2012/0257501 | A1 * | 10/2012 | Kucharczyk ............ | H04L 47/30 370/235 |

FOREIGN PATENT DOCUMENTS

| | | |
|---|---|---|
| EP | 1973282 | 9/2008 |
| JP | 2010224866 | 10/2010 |

OTHER PUBLICATIONS

PCT Application No. PCT/US2014/011073 International Search Report and Written Opinion, Mar. 18, 2014, 7 pages.

* cited by examiner

*Primary Examiner* — Mohamed Wasel
(74) *Attorney, Agent, or Firm* — DeLizio Law, PLLC

(57) ABSTRACT

Rate limiting operations can be implemented at an ingress DMA unit to minimize the probability of dropped packets because of differences between the communication rates of the ingress DMA unit and a packet processing engine. The communication rate associated with each of the software ports of a communication device can be determined and an aggregate software port ingress rate can be calculated by summing the communication rate associated with each of the software ports. The transfer rate associated with the ingress DMA unit can be limited so that packets are transmitted from the ingress DMA unit to the packet processing engine at a communication rate that is at least equal to the aggregate software port ingress rate. If each software port comprises a dedicated rate-limited ingress DMA queue, packets from a rate-limited ingress DMA queue can be transmitted at the at least the communication rate of the corresponding software port.

37 Claims, 8 Drawing Sheets

DIRECT MEMORY ACCESS RATE LIMITING IN A COMMUNICATION DEVICE

BACKGROUND

Embodiments of the inventive subject matter generally relate to the field of communication networks and, more particularly, to direct memory access (DMA) rate limiting in a communication device.

A communication device typically comprises one or more network ports that couple the communication device to one or more communication networks. The network ports can be classified as hardware managed network ports ("hardware ports") and software managed network ports ("software ports"). The hardware ports refer to those network ports whose data-path processing is entirely handled in hardware. In other words, system software does not process packets transmitted/received over the hardware ports. The software ports refer to those network ports which require system software (e.g., executing on a central processing unit (CPU)) to perform certain aspects of data-path processing. Thus, while both hardware and software managed ports may have driver software running on a high-level operating system (e.g., Linux®), software managed ports leverage this driver software for per-packet operations, while hardware managed ports perform data-path processing only in hardware.

SUMMARY

Various embodiments for DMA rate limiting in a communication device are disclosed. In one embodiment, a communication rate associated with each of a plurality of software ports of a communication device is determined for providing packets to a packet processing engine via an ingress DMA unit of the communication device. An aggregate software port ingress rate of the communication device is determined based on a sum of the communication rate associated with each of the plurality of software ports. A transfer rate associated with the ingress DMA unit is limited to the aggregate software port ingress rate in providing the packets to the packet processing engine.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
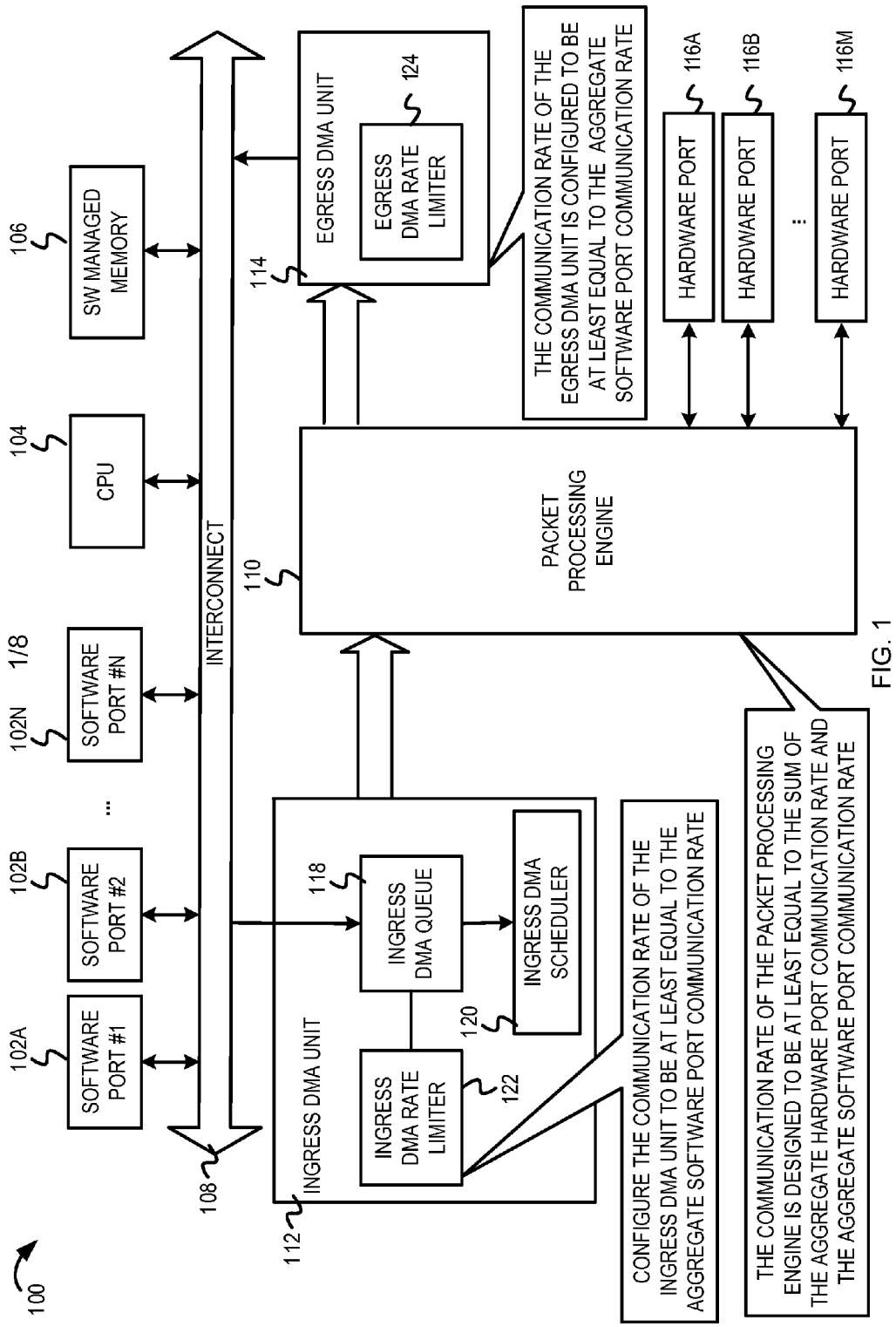
FIG. 1 is an example conceptual diagram illustrating one embodiment of a communication device including a rate-limited ingress DMA unit.

The description that follows includes exemplary systems, methods, techniques, instruction sequences, and computer program products that embody techniques of the present inventive subject matter. However, it is understood that the described embodiments may be practiced without these specific details. For instance, although embodiments describe the hardware ports as Ethernet ports and the software ports as wireless local area network (WLAN) ports, embodiments are not so limited. In other embodiments, the hardware ports and the software ports can support other suitable communication technologies and protocols (e.g., the hardware ports may be WLAN ports while the software ports may be Ethernet ports). In other instances, well-known instruction instances, protocols, structures, and techniques have not been shown in detail in order not to obfuscate the description.

A communication device may comprise hardware managed network ports ("hardware ports") and software managed network ports ("software ports"). The hardware ports are configured to directly connect to and communicate with a packet processing engine of the communication device. The software ports are configured to communicate with the packet processing engine via an intermediate processor (e.g., a CPU) and a software managed memory. For example, a packet received at a hardware port may be directly provided to the packet processing engine, and a packet destined for a hardware port may be directly provided from the packet processing engine to the appropriate hardware port. In contrast, a packet received at a software port may be stored in the software managed memory, pre-processed by the CPU, and subsequently provided to the packet processing engine via an ingress direct memory access (DMA) unit. Similarly, a packet destined for a software port may be stored in the software managed memory (by an egress DMA unit coupled with the packet processing engine), processed by the CPU, and subsequently provided to the software port for egress transmission. The packet processing engine typically has a fixed communication rate (e.g., throughput or packet processing capacity) that may be much smaller than the bus bandwidth between the CPU (or software managed memory) and the ingress DMA unit (to the packet processing engine). In current implementations of the software ports, software may wait until multiple incoming packets accumulate in the software managed memory, allowing the CPU to process the incoming packets in batches. This may be done to minimize overheads due to context switching, thereby allowing efficient utilization of the CPU. This batch-processing of packets by the CPU can result in the ingress DMA unit transferring multiple packets, in series, to the packet processing engine. Because the batch of multiple packets is transmitted at the higher bus throughput, this can artificially raise the rate at which packets are received by the packet processing engine. Therefore, the instantaneous rate at which the ingress DMA unit transfers packets to the packet processing engine may be much higher than the rate at which the packet processing engine was designed to process packets (also referred to a virtual/artificial packet-burst). Also, if a software port receives an aggregated packet (e.g., a collection of multiple protocol data-units (PDUs) grouped together as one combined aggregate-PDU (APDU)), the CPU may break the aggregate packet into its constituent packets and try to simultaneously transmit all of the constituent packets to the packet processing engine, resulting in an artificial packet-burst. This can cause the packet processing engine to temporarily become overwhelmed, run out of processing resources, and consequently drop incoming packets. Furthermore, these artificial packet-bursts at the software ports can also impact the performance of the hardware ports and can result in packets received at the hardware ports being dropped. This can affect the performance of the communication device and of other network devices communicatively coupled with the communication device. In contrast, hardware ports are directly connected to the packet processing engine at line-speed and may not experience artificial packet-bursts.

Figure 2:
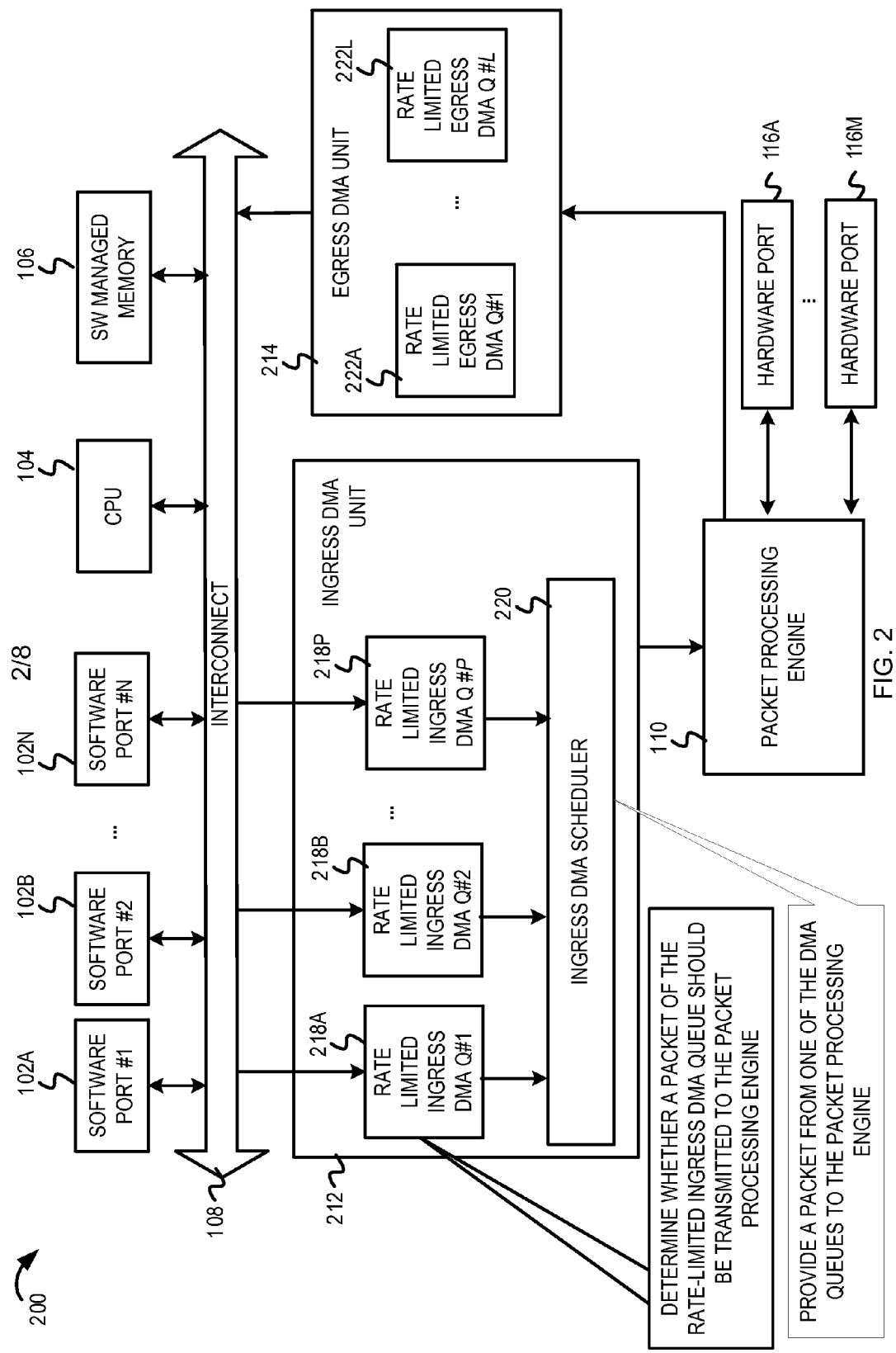
FIG. 2 is an example conceptual diagram illustrating another embodiment of a communication device including rate-limited ingress and egress DMA queues.

In some embodiments, a communication device can be configured to implement a rate-limiting ingress DMA unit to the packet processing engine. The ingress DMA unit can be rate-limited to ensure that incoming traffic from a software port (to the packet processing engine) is regulated to be in accordance with the performance thresholds (e.g., in terms of throughput, packets processed per second, packets transferred per second, or other suitable metrics depending on the design of the packet processing engine). In one embodiment (as depicted in FIG. 1), the ingress DMA unit can comprise a single rate limiter to limit the transfer rate of the ingress DMA unit to the aggregate communication rate of the software ports of the communication device. In other words, if the communication device comprises two software ports—a 600 Mbps WLAN port and a 400 Mbps USB port, the transfer rate of the ingress DMA unit can be limited so that the ingress DMA unit transmits packets at a communication rate that is greater than or equal to 1 Gbps. Furthermore, the sum of the aggregate communication rate of the software ports and aggregate communication rate of hardware ports of the communication device may be configured to be less than an aggregate processing capability of the packet processing engine. In one embodiment (as depicted in FIG. 2), the ingress DMA unit may comprise multiple rate-limited ingress DMA queues, each of which maps to a corresponding software port. In other words, each of the ingress DMA queues associated with corresponding each of the software ports can comprise a dedicated rate limiter. Each of the dedicated rate limiters can be configured to limit the throughput of the ingress DMA queue to the maximum sustained throughput that the corresponding software port is capable of receiving and providing to the packet processing engine. In each of the embodiments, the rate limiters can be configured to ensure that packets are transmitted from the ingress DMA unit to the packet processing engine at a communication rate that is less than the designed communication rate limits of the packet processing engine.

In some embodiments, one or more rate limiters may also be employed at an egress DMA unit of the communication device to control/limit the load imposed on the CPU and to control the rate at which the CPU receives outgoing packets directed to the software ports. The DMA rate-limiting mechanism can also enable prioritization of packets handled by the CPU on egress from the packet processing engine to a software port. The use of rate-limited DMAs can regulate and minimize artificial packet-bursts of traffic from the software ports on ingress to the packet processing engine, minimize the possibility of temporary resource starvation in the packet processing engine, and consequently minimize the possibility of packet drops. Likewise, on egress, rate limited DMAs can limit the load imposed on the CPU managing egress software ports, thereby minimizing packet drops of higher-priority traffic.

FIG. 1 is an example conceptual diagram illustrating one embodiment of a communication device 100 including a rate-limited ingress DMA unit. In FIG. 1, the communication device 100 comprises N software ports—software port #1 102A, software port #2 102B . . . software port #N 102N, collectively referred to herein as "software ports 102". The communication device 100 also comprises a central processing unit (CPU) 104 and software managed memory 106. The communication device 100 further comprises an interconnect 108 (e.g., a system bus) that couples various components of the communication device 100. In FIG. 1, the software ports 102, the CPU 104, and the software managed memory 106 are coupled with an ingress DMA unit 112 via the interconnect 108. Also, the software ports 102, the CPU 104, and the software managed memory 106 are coupled with an egress DMA unit 114 via the interconnect 108. The communication device 100 also comprises a packet processing engine 110. The packet processing engine 110 is coupled with the ingress DMA unit 112, the egress DMA unit 114, and M hardware ports—hardware port 116A, hardware port 116B, . . . hardware port 116M, collectively referred to herein as "hardware ports 116". The ingress DMA unit 112 comprises an ingress DMA queue 118 (also referred to as a DMA channel), an ingress DMA scheduler 120, and an ingress DMA rate limiter 122. The egress DMA unit 114 comprises an egress DMA rate limiter 124. Although not depicted in FIG. 1, the egress DMA unit 114 may also comprise an egress DMA queue and an egress DMA scheduler, as similarly depicted for the ingress DMA unit 112. As will be further described below, the ingress DMA rate limiter 122 can be configured to limit the transfer rate of the ingress DMA unit 112 and to control the communication rate at which packets received from the software ports are provided to the packet processing engine 110. In some embodiments, the transfer rate at which packets received from the software ports are provided to the packet processing engine 110 may be based on the aggregate communication rate of all the software ports.

In some embodiments, the communication device 100 may be an electronic device configured to implement one or more communication protocols or access technologies, such as a network router, a home gateway, a WLAN access point, a laptop computer, a tablet computer, a mobile phone, a smart appliance, a gaming console, a desktop computer, or other suitable electronic device. In some embodiments, the components of the communication device 100 may be implemented on a single system-on-a-chip (SoC) or on a collection of chips. For example, in some embodiments, the packet processing engine 110 can be a network packet processing engine that is implemented on a circuit board, an SoC, an application specific integrated circuit (ASIC), or a suitable integrated circuit (IC) that is coupled to one or more other chips and/or software that comprise other components of the communication device 100. In some embodiments, in addition to the packet processing engine, the circuit board may also comprise multiple network interfaces enable the communication device 100 to receive/transmit packets via multiple communication media. For example, the communication device 100 can have Ethernet connectivity, WLAN connectivity, powerline communication (PLC) connectivity, wide area network (WAN) modem connectivity, etc. In some embodiments, one or more components of the communication device 100 may be implemented as part of a communication unit. For example, the communication unit may comprise the ingress DMA unit 112, the egress DMA unit 114, and the packet processing engine 110. The communication unit may be configured to implement one or more communication protocols or access technologies. The communication unit may be implemented on a SoC, an ASIC, or another suitable integrated circuit.

In FIG. 1, the CPU 104 executes functionality for boot-up and initialization of the various components and subsystems of the communication device 100, for intermediate processing of packets received from and destined for the software ports 102A, 102B . . . 102N, for interfacing packets received from software ports to the packet processing engine 110 via the ingress DMA unit 112, for interfacing packets destined for the software ports from the packet processing engine 110 (and the egress DMA unit 114), for managing system resources and peripheral components of the communication device 100, etc. The packet processing engine 110 can be used to offload some operations, such as per-packet network processing, from the system CPU 104. In one example, the packet processing engine 110 may execute functionality for bridging, routing, virtual local area network (VLAN) processing, tunnel processing, packet classification, etc. The packet processing engine 110 may also execute functionality for identifying a suitable egress port from which to transmit outgoing packets and an egress priority of the packet.

In one embodiment, the hardware ports 116 may be configured to transmit and receive packets using a first communication protocol; while the software ports 102 may be configured to transmit and receive packets using a second communication protocol. For example, the hardware ports 116 may be Ethernet ports that couple the communication device 100 to an Ethernet for transmitting/receiving Ethernet packets. One or more of the software ports 102A, 102B . . . 102N may be WLAN ports (e.g., IEEE 802.11 ports) that couple the communication device 100 to the WLAN for transmitting/receiving WLAN packets. One or more of the software ports 102A, 102B . . . 102N may be USB ports that couple the communication device 100 to a USB compatible device (e.g., a locally attached disk-drive) which may operate as a network attached storage element when coupled with communication device 100.

Typically, the hardware ports 116 can have a direct connection (e.g., a physical connection) to the packet processing engine 110. In other words, the packet processing engine 110 can directly receive incoming packets from the hardware ports 116 and can directly transmit outgoing packets to the appropriate hardware ports 116. In some embodiments, as depicted in FIG. 1, the same set of hardware ports 116 may be used as ingress hardware ports (e.g., to receive incoming packets from external communication devices) and as egress hardware ports (e.g., to transmit outgoing packets to external communication devices). In other embodiments, the communication device 100 can comprise two sets of hardware ports—a first set of ingress hardware ports that only receive incoming packets from external communication devices and provide the received packets to the packet processing engine 110 and a second set of egress hardware ports that that only receive outgoing packets from the packet processing engine 110 for transmission to external communication devices.

As depicted in FIG. 1, the software ports 102 are not directly connected to the packet processing engine 110. Instead, on the input side, the software ports 102 are interfaced to the packet processing engine 110 via the interconnect 108 and the ingress DMA unit 112. On the output side, the software ports 102 are interfaced to the packet processing engine 110 via the egress DMA unit 114 and the interconnect 108. Packets received at the software ports may require software processing before the packets can be provided to the packet processing engine 110 and the packets generated by the packet processing engine 110 may require software processing before the packets can be transmitted via the appropriate software port(s). In contrast, the hardware ports 116 directly interface with the packet processing engine 110 and packets received from or transmitted to the hardware ports 116 do not require additional intermediate software processing. Each of the hardware ports 116 and the software ports 102 may have a corresponding well-defined maximum throughput limit. However, software drivers (e.g., the CPU 104) processing the packets (received from the software ports) may process multiple packets en-bloc and may release the packets simultaneously for processing by the packet processing engine 110. This can result in a large number of packets suddenly becoming available at the ingress DMA unit 112. Packet transfers from the ingress DMA unit 112 to the packet processing engine 110 are only limited by the bandwidth of the interconnect 108, which can be much larger than the throughput/capacity of the packet processing engine 110. As discussed above, if the packet processing engine 110 receives large bursts of packets from the software ports 102, this can lead to processing resource starvation within the packet processing engine 110 (e.g., shortage of internal buffer-memory to store packets on-the-fly). As a result, packets originating at the software ports 102 and/or packets ingressing to the packet processing engine 110 from the hardware ports 116 may be dropped at the packet processing engine 110.

In one embodiment, a software port (e.g., the software port 102A) can receive a packet. In one example, the software port 102A can be a WLAN port and may accordingly, receive a WLAN packet. The software port 102A can store the received WLAN packet in the software managed memory 106 and generate an interrupt to notify the CPU 104 of the received WLAN packet. In response to the interrupt, the CPU 104 can access the WLAN packet from the software managed memory 106, convert the WLAN packet into a format recognized by the packet processing engine 110 (e.g., the CPU 104 can convert the WLAN packet into an Ethernet packet), and provide the resultant packet (e.g., the resultant Ethernet packet) to the ingress DMA unit 112. For example, the CPU 104 can strip the WLAN header from the received WLAN packet, encapsulate the payload of the WLAN packet with an Ethernet header, and perform other suitable functions. The ingress DMA unit 112 can then transfer the Ethernet packets at an appropriate rate/throughput to the packet processing engine 110 for subsequent processing, as will be further described below. After intermediate software processing by the CPU 104 (described above), the packets received via the software ports 102 can be stored in the ingress DMA queue 118 of the ingress DMA unit 112. In some embodiments, the ingress DMA scheduler 120 can provide packets from the ingress DMA queue 118 to the packet processing engine 110 at a communication rate that is at least equal to an aggregate ingress rate of the software ports ("aggregate software port ingress rate") and that is less than the designed communication rate limits of the packet processing engine 110.

The ingress DMA rate limiter 122 can be configured to limit the transfer rate of the ingress DMA unit 112 based on the aggregate communication rate of the software ports 102. The processing rate of the packet processing engine 110 may be described in terms of throughput, which is measured in bits per second (bps) and/or packets processed per second (pps). For example, the communication device 100 may comprise three software ports—two WLAN ports 102A and 102B and a USB port 102N. If the peak communication rate of the WLAN ports 102A and 102B is 400 Mbps and 300 Mbps respectively and if the peak communication rate of the USB port 102N is 300 Mbps, the aggregate peak ingress throughput of the software ports 102 ("aggregate peak software port ingress rate") is 1 Gbps. In this example, the DMA rate limiter 122 may be configured to limit the transfer rate of the ingress DMA unit 112 to be at least equal to 1 Gbps (i.e., the aggregate peak software port ingress rate). In other words, to prevent packet drops at ingress (e.g., before the packets are provided to and processed by the packet processing engine 110), the ingress DMA rate limiter 122 can ensure that the ingress DMA unit 112 transfers packets (to the packet processing engine 110) at a minimum communication rate of 1 Gbps. The maximum communication rate at which the ingress DMA unit 112 transmits packets to the packet processing engine 110 can be limited based on the design communication rate limits of the packet processing engine 110. For example, the packet processing engine 110 may be designed to process packets at a maximum rate of 2 Gbps. In this example, the ingress DMA rate limiter 122 can ensure that the ingress DMA unit 112 transfers packets (to the packet processing engine 110) at a maximum communication rate of 2 Gbps minus an aggregate peak ingress throughput of the hardware ports 116; even if the actual bandwidth between the software managed memory 106 and the ingress DMA unit 112 via the interconnect 108 is much higher (e.g., 10 Gbps).

As depicted in FIG. 1, the packet processing engine 110 is shared between the hardware ports 116 and the software ports 102 of the communication device 100. The packet processing engine 110 can be configured to receive packets received via the hardware ports 116 and software ports 102, perform network packet processing on the received packets, and transfer packets to the egress ports (e.g., an appropriate hardware or software port) as determined based on the network packet processing. As part of network packet processing, the packet processing engine 110 may determine the egress port of the packet as well as the egress packet priority.

The packet-processing engine 110 can be designed to handle the aggregate of the maximum throughputs of the individual network ports. In other words, the packet-processing engine 110 can be designed so that the maximum processing rate of the packet processing engine 110 is at least equal to the sum of the aggregate ingress throughputs of hardware ports 116 ("aggregate hardware port ingress rate") and the aggregate ingress throughput of software ports 102 ("aggregate software port ingress rate"). For example, assuming that the communication device 100 comprises three software ports and two hardware ports, and that the communication rate of each of the ports is 500 Mbps, then the communication rate of the packet processing engine 110 can be designed to be at least equal to 2.5 Gbps.

After the packet processing engine 110 processes the incoming packets (e.g., either received from the software ports 102 via the ingress DMA unit 112 or received directly from the hardware ports 116), the packet processing engine 110 may generate one or more outgoing packets for transmission. The packet processing engine 110 can use any suitable routing techniques (e.g., forwarding tables) to determine the egress port of the packet. If the egress port is determined to be a hardware port, the packet is directly transmitted to the determined hardware port because the hardware ports are directly connected to the packet processing engine 110 (as depicted in FIG. 1).

However, if the egress port is determined to be a software port (e.g., the software port 102B), the packet processing engine 110 forwards the outgoing packet to the egress DMA unit 114. The egress DMA unit 114 can transfer the outgoing packet to the software-managed memory 106, where the outgoing packet is subsequently processed by the driver (executing on CPU 104) of the software-port 102B and is eventually transmitted by the software port 102B. The egress DMA unit 114 may also be rate-limited and the transfer rate of the egress DMA unit 114 (e.g., the egress DMA rate limiter 124) can be configured to be less than the maximum rate at which the CPU 104 can process packets. The egress DMA unit 114 may generate an interrupt to notify the CPU 104 of the outgoing packet transferred to the software-managed memory 106. In response to the interrupt, the CPU 104 (e.g., a software port 102B driver that executes on the CPU 104) can access the packet from the software managed memory 106, and execute one or more operations for egress transmission via the determined software port 102B. For example, if the software port 102B is a WLAN port, the CPU 104 can convert the outgoing packet in the software managed memory 106 to an appropriate WLAN packet format and can subsequently schedule the packet for transmission from the software port 102B.

It is noted that in some embodiments, the communication device 100 may be implemented differently from the example of FIG. 1. In some implementations, the functional components of the communication device 100 may be partitioned differently from that depicted in FIG. 1. For example, the ingress DMA queue 118 may be implemented as part of the ingress DMA rate limiter 122. As another example, the ingress DMA unit 112 may comprise more than one ingress DMA queue/channel. As another example, the communication device 100 may comprise any suitable number of software and hardware ports, any suitable number of CPUs, and other suitable types of interconnects. Likewise, the egress DMA unit 114 may comprise additional DMA queues/channels. These additional DMA queues/channels may be individually rate-limited. Furthermore, the communication device 100 may also comprise additional components not depicted in FIG. 1 (e.g., a hardware-managed memory for storing packets received from or intended for the hardware ports 116).

In some embodiments, to reduce "burstiness" of the incoming traffic (or ingress traffic) from the software ports, packets received at each of the software ports can be mapped to separate ingress DMA queues (also referred to as ingress DMA channels). Each of the ingress DMA queues can comprise their respective rate limiter. The ingress DMA queue including a rate limiter is referred to herein as a "rate-limited ingress DMA queue."

Likewise, in some embodiments, outgoing traffic (or egress traffic) from the packet processing engine 110 may be mapped to separate egress DMA queues via independent DMA channels. Egress mapping to an egress DMA channel may be configured based on an egress priority level determined by the packet processing engine 110, an egress software port determined by the packet processing engine 110, a CPU assigned to handle the egress software port (e.g., if the communication device 100 comprises multiple CPUs that share the processing load), and/or other suitable parameters. Each egress DMA queue may comprise a corresponding rate-limiter. The egress DMA queue including a rate limiter is referred to herein as a "rate-limited egress DMA queue." As will be further described with reference to FIG. 2, implementing multiple rate-limited ingress DMA queues corresponding to each of multiple software ports can enable fine control over the throughput associated with each software port. Also, as will be described with reference to FIG. 2, implementing multiple rate-limited egress DMA queues with a flexible mapping to egress ports can enable fine control over CPU load, per port egress throughput, and egress packet prioritization.

FIG. 2 is an example conceptual diagram illustrating another embodiment of a communication device 200 including a rate-limited ingress and egress DMA queues. In FIG. 2, the communication device 200 comprises N software ports 102 and M hardware ports 116. Similar to FIG. 1, the communication device 200 comprises a CPU 104 and software managed memory 106. The software ports 102, the CPU 104, and the software managed memory 106 are coupled to the packet processing engine 110 via an ingress DMA unit 212 and an interconnect 108 (e.g., a system bus). The packet processing engine 110 of the communication device 200 is coupled with the ingress DMA unit 212, an egress DMA unit 214, and M hardware ports 116. The ingress DMA unit 212 comprises P rate-limited ingress DMA queues 218A, 218B . . . 218P, collectively referred to herein as "rate-limited ingress DMA queues 218." The rate-limited ingress DMA queues 218A, 218B . . . 218P may be associated with software ports 102A, 102B . . . 102N, via a mapping function implemented on driver software running on the CPU 104. The ingress DMA unit 212 also comprises an ingress DMA scheduler 220, which determines the order in which packets from each of the rate-limited ingress DMA queues 218A, 218B . . . 218P are provided to the packet processing engine 110. Likewise, the egress DMA unit 214 comprises L rate-limited egress DMA queues 222A 222L, collectively referred to herein as "rate-limited egress DMA queues 222." Each of the rate-limited egress DMA queues may be mapped to egress software ports, egress priority levels, or egress CPU, or combinations thereof. It is noted that although not depicted in FIG. 2, the egress DMA unit 214 may comprise an egress DMA scheduler, as similarly depicted with reference to the ingress DMA unit 212. In some embodiments, the number of rate-limited ingress DMA queues P may be equal to the number of software ports N. Likewise, in some embodiments, the number of rate-limited egress DMA queues L may be equal to the number of software ports N.

As discussed above with reference to FIG. 1, the hardware ports 116 of the communication device 200 can have a direct connection to the packet processing engine 110 so that the packet processing engine 110 can directly receive incoming packets from the hardware ports 116 and can directly transmit outgoing packets to the hardware ports 116. Also, the software ports 102 are connected to the packet processing engine 110 via ingress DMA unit 212 and the egress DMA unit 214 and interconnect 108. Packets received from the software ports may require some intermediate processing before they are provided to the packet processing engine 110.

In some embodiments, the number of the rate-limited ingress DMA queues P may be equal to the number of software ports N. In other words, there may be a 1:1 correspondence between the number of software ports and the number of the rate-limited ingress DMA queues. Each rate-limited ingress DMA queue can comprise a dedicated rate limiter to control the rate at which packets are provided from a software port to the packet processing engine 110. In FIG. 2, each rate limiter can be configured (e.g., programmed by software) to limit the maximum transfer rate at which packets are provided to the packet processing engine 110 to the communication rate of the software port mapped to the rate-limited ingress DMA queue. The maximum transfer rate at which packets are provided to the packet processing engine 110 can be represented in terms of throughput, capacity, packets per second, a combination of the aforementioned parameters, etc. Specifically, the rate-limiter of the rate-limited ingress DMA queue 218A associated with the software port 102A can be configured to ensure that packets of the rate-limited ingress DMA queue 218A are provided (to the packet processing engine 110) at a communication rate that is at least equal to the maximum communication rate of the software port 102A and that is less than the designed communication rate limits of the packet processing engine 110. The communication rate can be described in terms of throughput, packets transferred per second, and/or packets processed per second. In some embodiments, each rate-limited ingress DMA queue can receive packets from their corresponding software port at a rate that is at least equal to sustained/continuous throughput of the software port. Therefore, burstiness introduced by software (e.g., aggregation or accumulation of packets) can be managed and resolved in the software managed memory 106 (which is relatively larger than the internal memory of the packet processing engine 110). In one specific example, the software port 102A may be an 802.11ac WLAN port with a throughput of 1 Gbps, the software port 102B may be a USB2 port with a throughput of 400 Mbps, and the packet processing engine 110 may be configured for a throughput of 2 Gbps. In this example, the rate limiter associated with the rate-limited ingress DMA queue 218A can be configured to ensure that packets of the rate-limited ingress DMA queue 218A are transmitted to the packet processing engine 110 at a communication rate that is at least equal to 1 Gbps and that is less than 2 Gbps. Likewise, the rate limiter associated with the rate-limited ingress DMA queue 218B can be configured to ensure that packets of the rate-limited ingress DMA queue 218A are transmitted to the packet processing engine 110 at a communication rate that is at least equal to 400 Mbps and that is less than 2 Gbps. The aggregate (sum) of the transfer rates associated with each of the rate-limited ingress DMA queues should be configured to be less than 2 Gbps. The ingress DMA scheduler 220 can retrieve a packet from each rate-limited ingress DMA queue and provide the packet to the packet processing engine 110 if appropriate communication rate conditions are satisfied, as will be further described with reference to FIGS. 3-5. In some embodiments, the DMA scheduler 220 can be a round-robin scheduler (that assigns an equal priority level to all the rate-limited ingress DMA queues); while in other embodiments, the ingress DMA unit 212 can be another suitable priority-based scheduler (e.g., a weighted round-robin (WRR) scheduler).

Because of rate limiting, a packet from each rate-limited ingress DMA queue 218A, 218B . . . 218N may not always be available for transmission to the packet processing engine 110. In some embodiments, for each rate-limited ingress DMA queue under consideration (e.g., the rate-limited ingress DMA queue 218A), the DMA scheduler 220 can determine whether a packet is available for transmission (e.g., based on a signal from the rate limiter of the rate-limited ingress DMA queue 218A). If a packet of the rate-limited ingress DMA queue 218A is not available, the DMA scheduler 220 can determine whether a packet of the next rate-limited ingress DMA queue (e.g., the rate-limited ingress DMA queue 218B) is available for transmission to the packet processing engine 110. It is noted that in some embodiments, the separation of packets into multiple rate-limited egress DMA queues may also enable prioritized access to a limited amount of CPU resources for processing egress packets destined to software ports. For example, egress throughput on one or more rate-limited egress DMA queues (e.g., associated with one or more egress software ports, associated with one or more egress priority levels, etc.) may be throttled relative to other rate-limited egress DMA queues.

Figure 3:
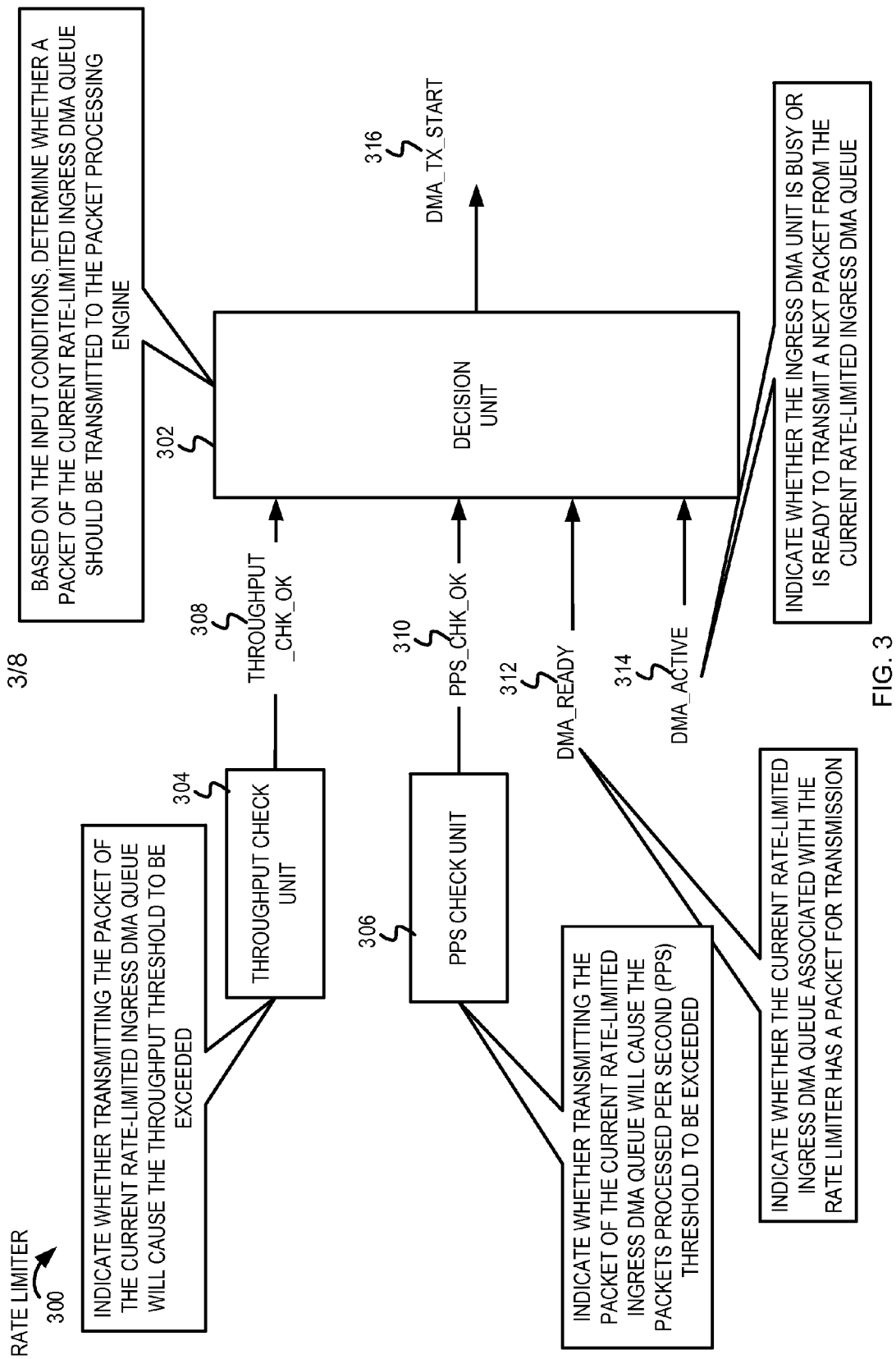
FIG. 3 depicts an example block diagram of a rate limiter.

FIG. 3 depicts an example block diagram of a rate limiter 300. In some embodiments, the communication rate of various components of the communication device 100 can be described in terms of bits per second throughput, packets transferred per second and/or packets processed per second (PPS). Accordingly, the rate limiter 300 of FIG. 3 can comprise two check units—a throughput (Mbps) check unit 304 and a PPS check unit 306. As will be further described in FIG. 3, a packet may be transferred to the packet processing engine 110 if a throughput check and a PPS check are successful. In one embodiment as depicted in FIG. 3, the rate-limiter 300 (e.g., associated with an rate-limited ingress DMA queue 218A) comprises a decision unit 302 that receives one or more input signals and determines, based on the received input signals, whether the rate limiter 300 (and consequently the ingress DMA scheduler 220 of the ingress DMA unit 212) should provide a packet from the rate-limited ingress DMA queue 218A to the packet processing engine 110. As depicted in FIG. 3, the throughput check unit 304 and the PPS check unit 306 are coupled to the input of the decision unit 302. The throughput check unit 304 can determine and indicate whether transferring the queued packet from the rate-limited ingress DMA queue 218A will violate the throughput threshold of the rate-limited ingress DMA queue 218A. The PPS check unit 306 can determine and indicate whether transferring the queued packet of the rate-limited ingress DMA queue 218A will violate the PPS threshold of the rate-limited ingress DMA queue 218A. Operations of the throughput check unit 304 and the PPS check unit 306 will further be described with reference to FIGS. 4 and 5 respectively.

In one embodiment, the decision unit 302 can receive the following inputs: 1) the throughput check signal 308 (e.g., a THROUGHPUT_CHK_OK signal) at the output of the throughput check unit 304, 2) the PPS check signal 310 (e.g., PPS_CHK_OK signal) at the output of the PPS check unit 306, 3) a DMA ready signal 312 (DMA_READY signal) that indicates whether the rate-limited ingress DMA queue (e.g., the queue 218A) comprises a queued packet for transmission and 4) a transmission active signal 314 (e.g., DMA_ACTIVE signal) that indicates the current transmission state of the ingress DMA queue 218A (e.g., whether a packet from the queue 218A is currently being transmitted to the packet processing engine 110). Based on these inputs, the decision unit 302 can generate a start transmission signal 316 (e.g., DMA_TX_START signal) to indicate that the queued packet can be transferred from the corresponding rate-limited ingress DMA queue 218A to the packet processing engine 110.

Once the packet transfer begins, the ingress DMA unit 212 may utilize one or more clock cycles to transmit the packet to the packet processing engine 110 (e.g., depending on the size/length of the packet, the transmission speed, etc.). Accordingly, while the rate-limited ingress DMA queue 218A is transferring a packet from the rate-limited ingress DMA queue 218A (to the packet processing engine 110), the decision unit 302 may not assert the start transmission signal 316 (i.e., the DMA_TX_START signal), preventing the start of transmission of the next packet in the rate-limited ingress DMA queue 218A.

With reference to the example of FIG. 3, the decision unit 302 can indicate that a packet of a current rate-limited ingress DMA queue (e.g., the rate-limited ingress DMA queue 218A) can be provided to the packet processing engine 110 if: 1) the current rate-limited ingress DMA queue 218A has a packet available for transmission to the packet processing engine (e.g., DMA_READY is active), 2) a packet is currently not being transmitted from the current rate-limited ingress DMA queue 218A (e.g., based on the DMA_ACTIVE signal), and 3) the throughput check unit 304 and the PPS check unit 306 determine that transfer of the queued packet will not cause the packet processing engine 110 to exceed the configured throughput-threshold and the PPS threshold for the rate-limited ingress DMA queue 218A. Once the aforementioned constraints are satisfied, the decision unit 302 can generate the start transmission signal (DMA_TX_START) 316 to indicate that a packet can be transmitted from the rate-limited ingress DMA queue 218A to the packet processing engine 110.

The decision unit 302 may implement the start transmission signal 316 as a pulse-signal (e.g., a signal that is at logic level one for one clock cycle) to indicate that a packet can be transmitted from the rate-limited ingress DMA queue 218A to the packet processing engine 110.

The ingress DMA scheduler 220 (depicted in FIG. 2) can determine the order in which packets from each of the rate-limited ingress DMA queues are transferred to the packet processing engine 110. In response to receiving the start transmission signal 316, the ingress DMA scheduler 220 can access and provide the queued packet from the associated the rate-limited ingress DMA queue 218A to the packet processing engine 110. The ingress DMA scheduler 220 can then identify a next rate-limited ingress DMA queue from which to transmit a packet (e.g., in a round-robin manner, based on priority, receiving a start transmission signal from a rate-limited ingress DMA queue, and/or based on other suitable factors). It should be noted that although FIG. 3 depicts the decision unit 302 permitting transmission of a packet of the rate-limited ingress DMA queue 218A only if all the aforementioned input conditions are satisfied, other suitable combinations and/or conditions are possible.

As discussed above, the packet processing engine 110 can be designed so that the communication rate of the packet processing engine 110 is greater than or equal to the sum of the aggregate software port ingress rate and the aggregate hardware port ingress rate. In some embodiments, each of the rate limiters can be configured to limit the communication rate of their respective DMA queues 218A, 218B . . . 218N to the maximum communication rate of the respective software ports. For example, if the communication device comprises a 600 Mbps WLAN port and a 400 Mbps USB port, the communication rate of the rate-limited ingress DMA queue that maps to the WLAN port can be limited to at least 600 Mbps and the communication rate of the rate-limited ingress DMA queue that maps to the USB port can be limited to at least 400 Mbps. The communication rate of the rate-limited ingress DMA queues can be configured to be less than the designed communication rate limits of the packet processing engine 110. In another embodiment, each of the rate limiters can be configured to limit the transfer rate of the ingress DMA unit 212 to at least the aggregate software port ingress rate.

Figure 4:
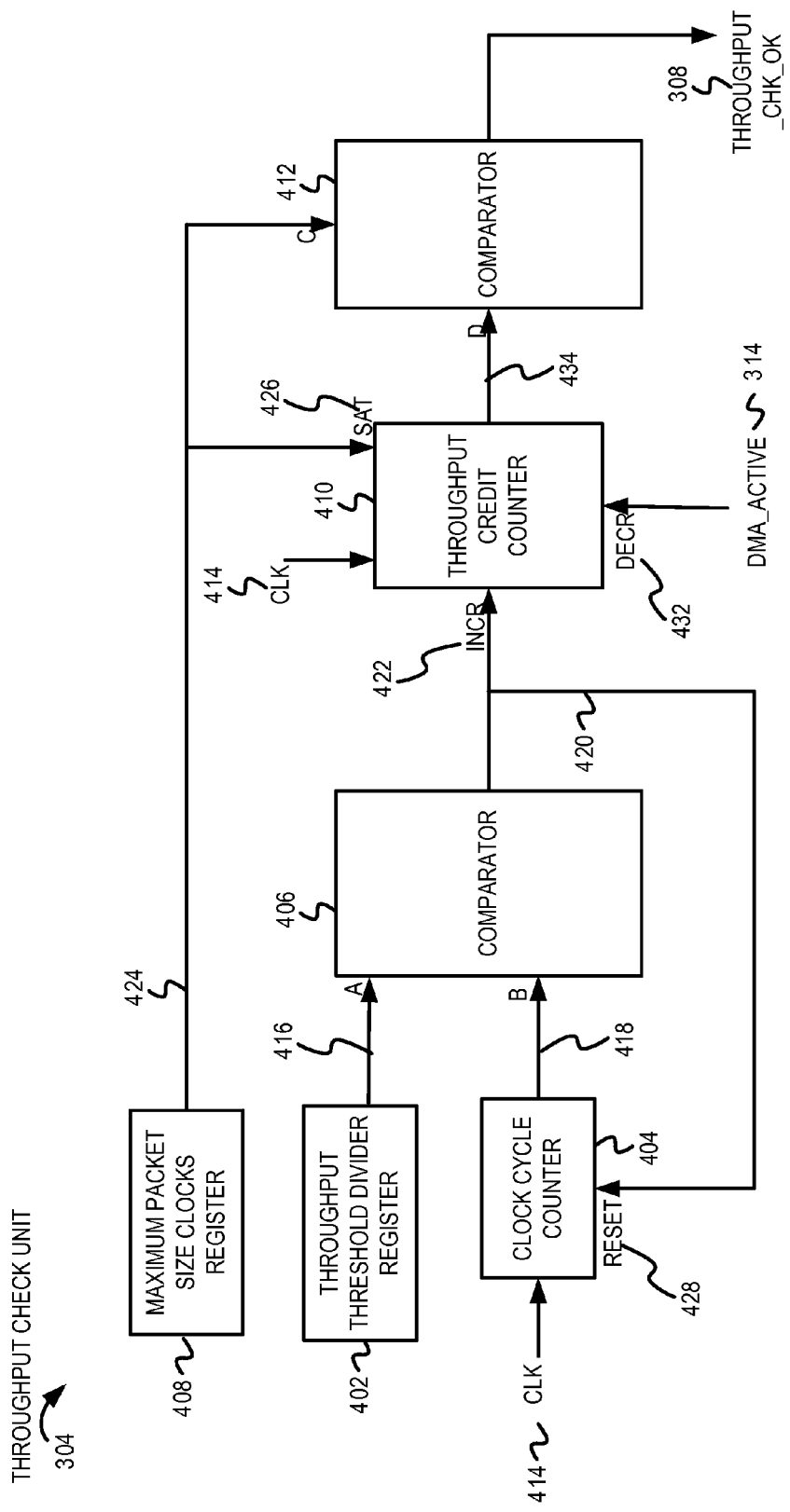
FIG. 4 is a block diagram illustrating example operations of a throughput check unit of a rate-limited ingress DMA queue.

FIG. 4 is a block diagram illustrating example operations of the throughput check unit 304 of a rate-limited ingress DMA queue. The throughput check unit 304 comprises a throughput threshold divider register 402 and a clock cycle counter 404. An input clock signal 414 is provided as an input to the clock cycle counter 404. The output 416 of the throughput threshold divider register 402 and the output 418 of the clock cycle counter 404 are provided as inputs to a first comparator 406. The output 420 of the first comparator 406 is provided as an input to an increment terminal (INCR) 422 of a throughput credit counter 410. In addition, the output 420 of the first comparator 406 is also fed back to a reset terminal 428 of the clock cycle counter 404. The output 424 of a maximum packet size clocks register 408 (e.g., the MAX_PKT_SIZE_CLKS register) is provided to a saturate terminal (SAT) 426 of the throughput credit counter 410. The clock signal 414 is also provided as an input to the throughput credit counter 410. Additionally, the transmission active signal 314 (e.g., the DMA_ACTIVE signal 314 of FIG. 3) is provided to a decrement terminal (DECR) 432 of the throughput credit counter 410. The output 434 of the throughput credit counter 410 and the output 424 of the maximum clock cycle register 408 are provided as inputs to a second comparator 412. The second comparator 412 generates the throughput check signal 308 (e.g., the THROUGHPUT_CHK_OK signal 308 discussed above in FIG. 3).

In some embodiments, the value of the throughput threshold divider register 402 can be preconfigured based on the interconnect bandwidth and the throughput to which the ingress DMA unit 212 should be limited. For example, if the interconnect bandwidth is 12000 Mbps and if the throughput of the ingress DMA unit 212 is to be limited to 6000 Mbps, then a value of 2 (i.e., 12000 Mbps/6000 Mbps) can be stored in the throughput threshold divider register 402.

The clock cycle counter 404 receives the clock signal 414 and increments a clock count value at each clock cycle. For example, the frequency of the clock signal 414 can be equal to the bus frequency (e.g., 200 MHz). In this example, the clock cycle counter 404 can increment the clock count value every 5 nanoseconds (i.e., at each clock cycle). If the bus width is 64 bits and the bus frequency is 200 MHz, then the bus throughput can be calculated as 64 bits×200 MHz=12.8 Gbps. In this example, where the bus throughput of 12.8 Gbps, the rate-limited ingress DMA queue (e.g., the rate-limited ingress DMA queue 218A) can be configured for a threshold throughput of 100 Mbps by setting the throughput threshold divider register 402 to 12.8 Gbps/100 Mbps=128. It is noted that different bus/interconnect implementations may have additional overheads that may also be taken into consideration when determining the threshold throughput, the throughput threshold divider value, etc.

The first comparator 406 receives two inputs—a current clock count value 418 at the output of the clock cycle counter 404 and a divider value 416 (e.g., 128) at the output of the throughput threshold divider register 402. The first comparator 406 operates so that if both of its inputs 416 and 418 match, then output signal 420 is set to a "true" logic-level. Thus, in this example, when the divider value 416 is equal to 128 (i.e., every time the clock cycle counter 404 counts 128 clock cycles), the first comparator 406 can generate a "true" signal. The output 420 of the first comparator 406 is a trigger pulse that is provided to the reset terminal 428 of the clock cycle counter 404 to reset the clock cycle counter 404 and to enable the clock cycle counter 404 to restart the process for counting the number of elapsed clock cycles.

The output 420 of the first comparator 406 is also provided to the increment terminal 422 of the throughput credit counter 410. The throughput credit counter 410 can check whether the throughput of the rate-limited ingress DMA queue (e.g., the rate-limited ingress DMA queue 218A) is within predetermined throughput thresholds (e.g., based on the configured throughput of the software port 102A that corresponds to the rate-limited ingress DMA queue 218A). In FIG. 4, the throughput credit counter 410 receives four input signals—the clock signal 414, the output 420 of the first comparator 406 at the increment terminal 422, a maximum packet size clock value 424 (i.e., the output 424 of the maximum packet size clocks register 408) at the saturation terminal 426, and the transmission active signal 314 at the decrement terminal 432.

The maximum packet size clock value 424 can indicate the number of clock cycles required to transmit a single packet of a maximum packet size (associated with the software port 102A) on the interconnect 108. In one specific example, assuming that the maximum size of a packet that will be transmitted is 9000 bytes (equivalent to a jumbo Ethernet frame) and that 64 bits can be transmitted per bus cycle, the number of bus cycles needed to transmit the 9000 byte packet is (9000*8/64)=1125. The number of bus cycles needed to transmit the largest packet may be stored in the maximum packet size clocks register 408. This maximum packet size clock value (e.g., 1125) is provided to the saturation terminal 426 of the throughput credit counter 410. In other words, the throughput credit counter 410 will saturate at (and will not increment beyond) the $1125^{th}$ clock cycle.

The second comparator 412 can receive a current throughput credit value 434 (from the throughput credit counter 410) and a maximum packet size clock value 424 (from the maximum packet size clocks register 408) as inputs. The second comparator 412 can determine whether sufficient throughput credits have been accumulated (e.g., whether there is sufficient capacity) to transmit the largest packet. Specifically, the second comparator 412 can compare the current throughput credit value 434 against the maximum packet size clock value 424 and can generate a "true" value on the throughput check signal 308 (e.g., the THROUGHPUT_CHK_OK signal 308 of FIG. 3) if the current throughput credit value 434 is equal to the maximum packet size clock value 424.

As discussed above with reference to FIG. 3, the output of the second comparator 412 (i.e., the throughput check signal 308) can be provided to the decision unit 302 of the rate limiter 300 of the rate-limited ingress DMA queue 218A. The decision unit 302 can determine whether or not the queued packet from the associated the rate-limited ingress DMA queue 218A should be transmitted based on the throughput check signal 308 and on other suitable factors described above in FIG. 3. Once transmission of a packet begins, the throughput credit value 434 is decremented for each bus cycle that the packet is transmitted. A next packet of the rate-limited ingress DMA queue 218A can be transmitted once the throughput credit counter 410 re-accumulates a sufficient number of throughput credits as described above.

Figure 5:
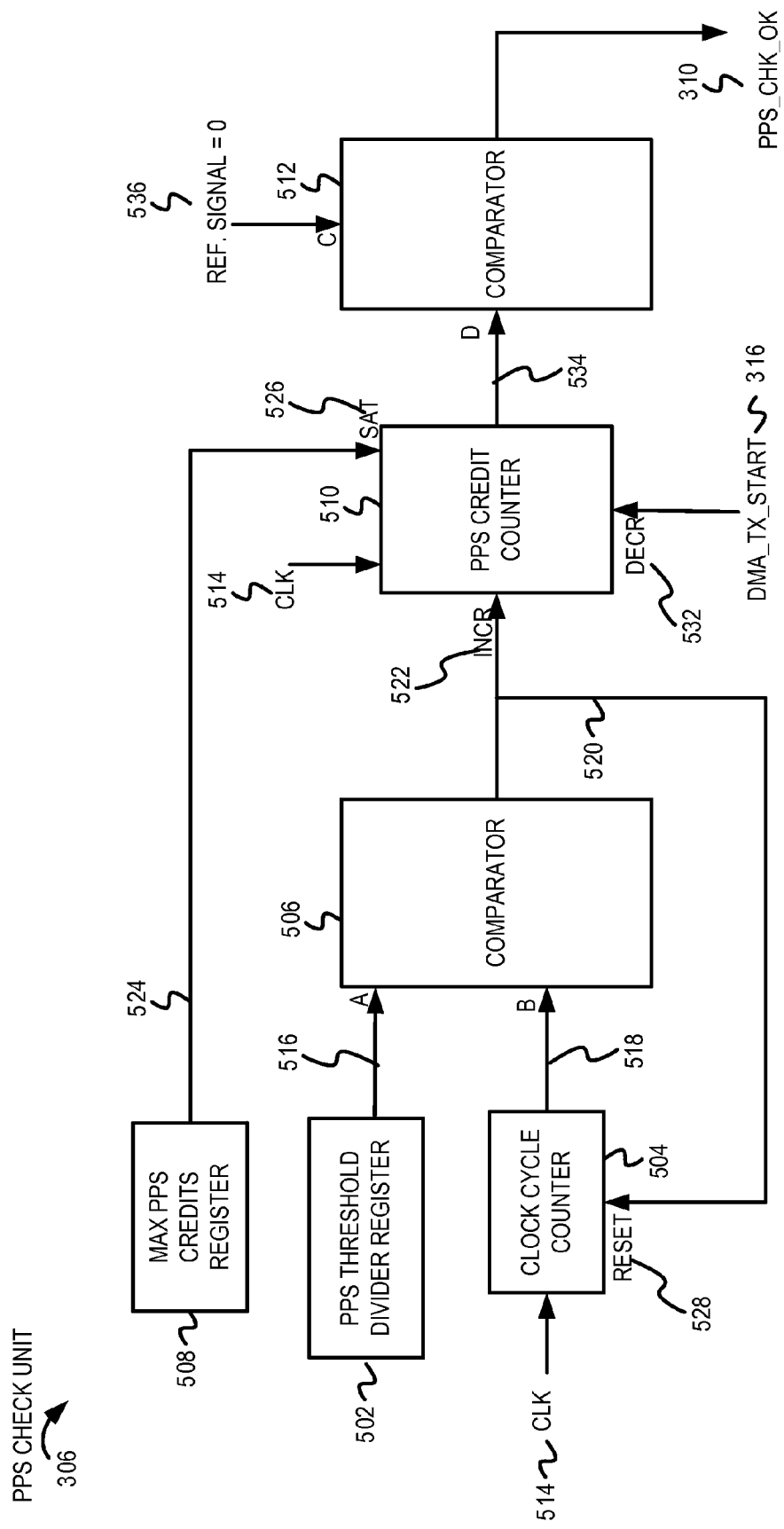
FIG. 5 is a block diagram illustrating example operations of a packets processed per second (PPS) check unit of a rate-limited ingress DMA queue.

FIG. 5 is a block diagram illustrating example operations of the PPS check unit 306 of a rate-limited ingress DMA queue. The PPS check unit 306 comprises a PPS threshold divider register 502 and a clock cycle counter 504. An input clock signal 514 is provided as an input to the clock cycle counter 504. The output 516 of the PPS threshold divider register 502 and the output 518 of the clock cycle counter 504 are provided as inputs to a first comparator 506. The output 520 of the first comparator 506 is provided as an input to an increment terminal (INCR) 522 of a PPS credit counter 508. In addition, the output 520 of the first comparator 506 is also fed back to a reset terminal 528 of the clock cycle counter 504. The output 524 of a maximum PPS credits register 508 is provided to a saturation terminal (SAT) 526 of the PPS credit counter 510. The clock signal 514 is also provided as an input to the PPS credit counter 510. Additionally, the start transmission signal 316 (e.g., the DMA_TX_START pulse signal described above in FIG. 3) is provided to a decrement terminal (DECR) 532 of the PPS credit counter 510. The output 534 of the PPS credit counter 510 and the output 524 of the maximum PPS credits register 508 are provided as inputs to a second comparator 512. The second comparator 512 generates the PPS check signal 310 (e.g., the PPS_CHK_OK signal 310 discussed above in FIG. 3).

The components of the PPS check unit 306 execute similar operations as the corresponding components of the throughput check unit 304 discussed above in FIG. 4. The value of a PPS threshold divider register 502 is typically configured based on the interconnect bandwidth and the PPS to which the ingress DMA unit 212 should be limited. As discussed above with reference to FIG. 4, the clock cycle counter 504 receives the clock signal 514 and increments a clock count value at each clock cycle. If the bus width is 64 bits and the bus frequency is, for example, 200 MHz, then the bus throughput can be calculated as 64 bits*200 MHz=12.8 Gbps. In one specific example, a rate-limited ingress DMA queue (e.g., the rate-limited ingress DMA queue 218A) can be configured for a threshold PPS of 1.6 million packets per second. In this specific example, if the size of the smallest packet is 64 bytes, if the smallest packet of 64 bytes requires 8 clock cycles for transmission, and if the bus throughput is 12.8 Gbps, the PPS divider value 516 (in the PPS threshold divider register 502) can be calculated as 12.8 Gbps/(64*1.6 million)=125. In other words, the rate-limited ingress DMA queue 218A can be configured for a threshold PPS of 1.6 million packets processed per second by setting the PPS threshold divider register 502 to 125.

The first comparator 506 receives two inputs—the current clock count value 518 at the output of the clock cycle counter 504 and a PPS divider value 516 (e.g., 125) at the output of the PPS threshold divider register 502. The first comparator 506 operates so that if both of its inputs 516 and 518 match, then output signal 520 is set to a "true" logic-level. Thus, in this example, when the PPS divider value 516 is equal to 125 (i.e. every time the clock cycle counter 504 counts 125 clock cycles), the first comparator 506 generates a "true" signal (e.g., a high logic level signal). The output 520 of the first comparator 506 is a trigger pulse that is provided to the reset terminal 528 of the clock cycle counter 504 to reset the clock cycle counter 504 and to cause the clock cycle counter 504 to restart the process for counting the number of elapsed clock cycles.

The output 520 of the first comparator 506 is also provided to an increment terminal 522 of the PPS credit counter 510. The PPS credit counter 510 can check whether the number of packets processed/received per second at the rate-limited ingress DMA queue 218A is within predetermined PPS thresholds (e.g., based on the configured PPS of the software port 102A that corresponds to the rate-limited ingress DMA queue 218A).

The maximum PPS credit value 524 in the maximum PPS credits register 508 can indicate the maximum sized burst that can be transmitted (e.g., a number of packets that can be transmitted successively). This is equivalent to the ratio of the maximum size of a packet that can be transferred to the minimum size of a packet that can be transferred. In one specific example, if the maximum size of a packet that can be transmitted is 9000 bytes and if minimum size of a packet that can be transmitted is 64 bytes, the maximum PPS credit value can be calculated as 9000/64=141. This maximum PPS credit value 524 is provided to the saturation terminal 526 of the PPS credit counter 510. In other words, the PPS credit counter 510 will saturate at (and will not increment beyond) the $141^{st}$ clock cycle.

The second comparator 512 can compare the accumulated output 534 of the PPS credit counter 510 against a threshold signal 536. If output 534 (of the PPS credit counter 510) is greater than the threshold signal 536, the second comparator 512 can set the PPS check signal (PPS_CHK_OK signal) 310 to "true." In some embodiments, as depicted in FIG. 5, the threshold signal 536 can be set to a value denoting 0. As discussed above with reference to FIG. 3, the output of the second comparator 512 (i.e., the PPS check signal 310) can be provided to the decision unit 302 of the rate limiter 300 of the rate-limited ingress DMA queue 218A. The decision unit 302 can determine whether the queued packet of the rate-limited ingress DMA queue 218A should be transmitted based on the PPS check signal 310 and on other suitable factors (described above in FIG. 3). Once transmission of the queued packet begins, the PPS credit value 534 is decremented by one, as described above. A next packet of the rate-limited ingress DMA queue 218A can be transmitted once the PPS credit counter 510 re-accumulates a sufficient PPS credits as described above.

Figure 6:
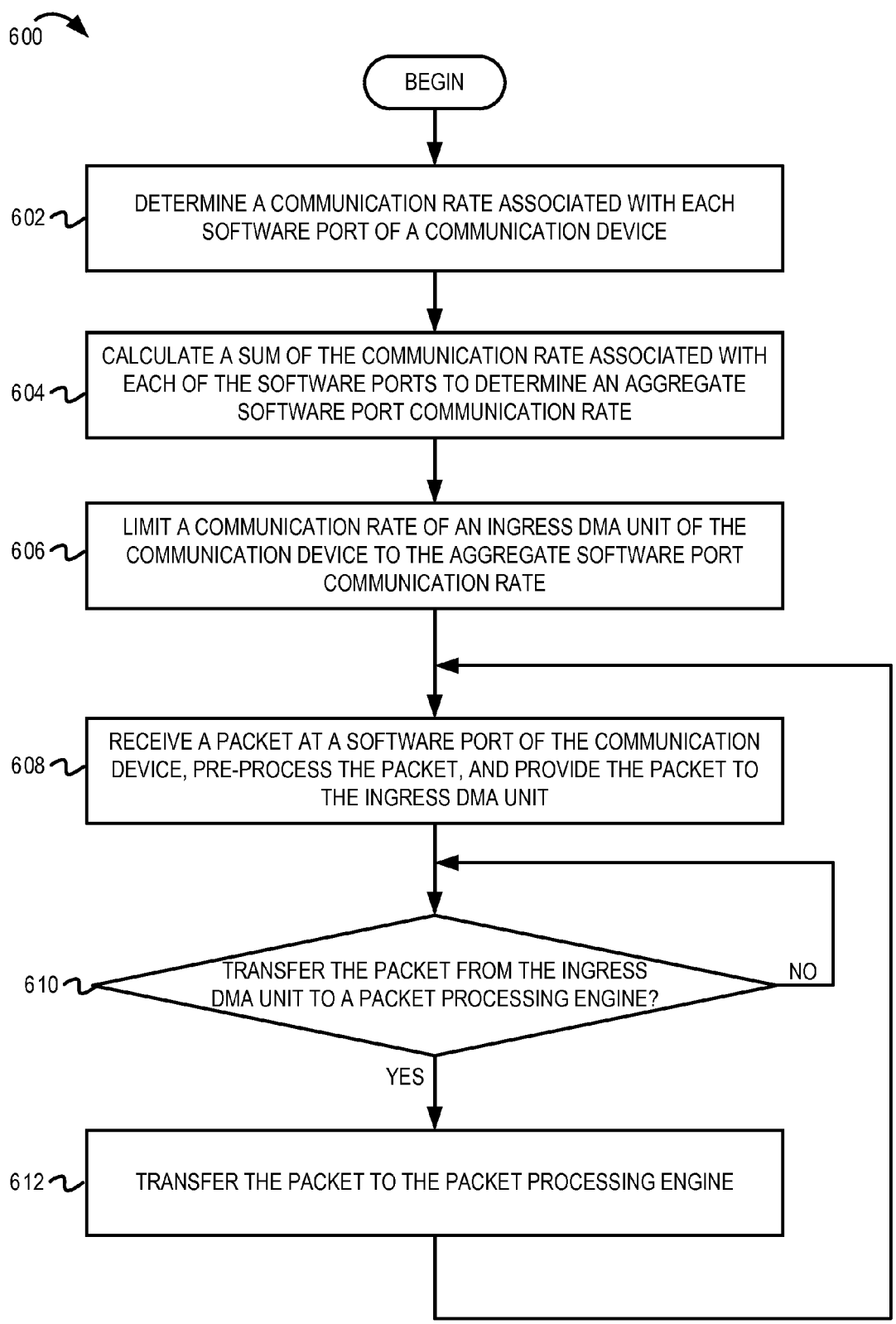
FIG. 6 is a flow diagram illustrating example operations of a rate-limited ingress DMA unit in a communication device.

FIG. 6 is a flow diagram ("flow") 600 illustrating example operations of a rate-limited ingress DMA unit in a communication device. The flow 600 begins at block 602.

At block 602, a communication rate associated with each software port of a communication device is determined. With reference to the example of FIG. 1, the CPU 104 can determine the communication rate associated with each software port 102A, 102B . . . 102N of the communication device 100. In one specific example, if the communication device 100 comprises an 802.11ac WLAN software port and a USB software port, the CPU 104 may determine that the 802.11ac WLAN software port has a communication rate of 1 Gbps and that the USB software port has a communication rate of 400 Mbps. It is noted that the communication rate can include various performance metrics. For example, the communication rate can comprise a bits per second (bps) throughput, a number of packets processed per second (PPS), packets transferred per second, and/or other suitable performance metrics (e.g., transactions per second (t/s),). The flow continues at block 604.

At block 604, a sum of the communication rate associated with each of the software ports is calculated to determine an aggregate software port ingress rate. For example, CPU 104 can calculate the sum of the communication rate associated with each of the software ports 102A, 102B . . . 102N to determine the aggregate software port ingress rate. With reference to the specific example above, the CPU 104 may determine that the aggregate software port ingress rate of the 1 Gbps 802.11 ac WLAN software port and the 400 Mbps USB software port is 1.4 Gbps. The flow continues at block 606.

At block 606, a transfer rate of an ingress DMA unit of the communication device is limited to the aggregate software port ingress rate. With reference to the specific example above, the CPU 104 may configure the rate limiter 122 to ensure that the transfer rate of the ingress DMA unit 112 is at least equal to the aggregate software port ingress rate (e.g., 1.4 Gbps) and does not exceed designed communication rate limits of a packet processing engine 110. The flow continues at block 608.

At block 608, a packet received at a software port of the communication device is pre-processed and provided to the ingress DMA unit. With reference to the example of FIG. 1, a packet may be received at the software port 102A of the communication device 100. The received packet may be stored in the software managed memory 106 and an interrupt may be provided to the CPU 104. The CPU 104 can pre-process the packet stored in the software managed memory 106 and can convert the packet into a format that is recognized by the packet processing engine. For example, the software port 102A may be a WLAN port that receives a WLAN packet, while the packet processing engine 110 may be configured to only process Ethernet packets. Accordingly, the CPU 104 can convert the received WLAN packet into an equivalent Ethernet packet and provide the Ethernet packet to the ingress DMA unit 112 for transmission to the packet processing engine 110. A descriptor for the packet (originally received via software port 102A) may be created in an appropriate ingress DMA queue. The descriptor in the ingress DMA queue is a representation of the received packet. In some embodiments, as depicted in FIG. 1, the ingress DMA unit 112 can comprise a single DMA queue 118 that is shared by all the software ports. In another embodiment, as depicted in FIG. 2, the ingress DMA unit 112 can comprise multiple ingress DMA queues 218A, 218B, . . . 218P, each of which may be mapped to individual software ports, to packet priorities, or based on other suitable mapping functions, as described above. Other operations for receiving a packet at a software port, pre-processing the received packet, and providing the packet to an appropriate rate-limited ingress DMA queue of the ingress DMA unit 112 can be executed as described above with reference to FIG. 1. The flow continues at block 610.

At block 610, it is determined whether the packet should be transferred from the ingress DMA unit to the packet processing engine. In some embodiments, the rate limiter (e.g., the rate limiter 122 of FIG. 1) can determine whether/when a packet should be transferred to the packet processing engine 110. In some embodiments, the rate limiter 300 can determine when a packet should be transferred to the packet processing engine 110. As discussed above, in response to receiving the packet, a descriptor (or representation) of the packet can be queued to the appropriate ingress DMA queue. Typically, the received packet remains stored in the software managed memory 106 and is transmitted to the packet processing engine 110 after the rate limiter 300 determines that the packet can be transferred to the packet processing engine 110.

As discussed above with reference to FIGS. 3-5, the rate limiter 300 may check one or more conditions and may indicate that a packet can be provided to the packet processing engine 110 only if all the conditions are satisfied. With reference to the example of FIG. 3, the rate limiter 300 may indicate that a packet can be provided to the packet processing engine 110 if there is a queued packet to be transferred to the packet processing engine 110, the ingress DMA unit 112 is not currently transferring another packet, transferring the queued packet will not cause a throughput threshold (e.g., of the packet processing engine 110) to be exceeded, and transferring the packet will not cause a PPS threshold (e.g., of the packet processing engine 110) to be exceeded. In some embodiments, the rate limiter 300 may transmit a start transmission signal 316 to the ingress DMA scheduler 120 indicating the queued packet may be transferred (also referred to as "DMA'd") to the packet processing engine 110. If it is determined that the packet should be provided to the packet processing engine 110, the flow continues at block 612. Otherwise, the flow loops back to block 610.

At block 612, the packet is transferred to the packet processing engine. For example, the ingress DMA unit 112 can provide the packet to the packet processing engine for further processing. As described above, the packet processing engine 110 may also determine the subsequent route of the packet and an egress port for the packet. The packet processing engine 110 can determine the egress port based on availability of software ports, a processing unit associated with the software ports, a priority of the packet, and/or other suitable factors. The packet processing engine 110 can then forward the packet to the appropriate egress port to transmission to another network device. From block 612, the flow loops back to block 608, where a next packet is received and processed.

Figure 7:
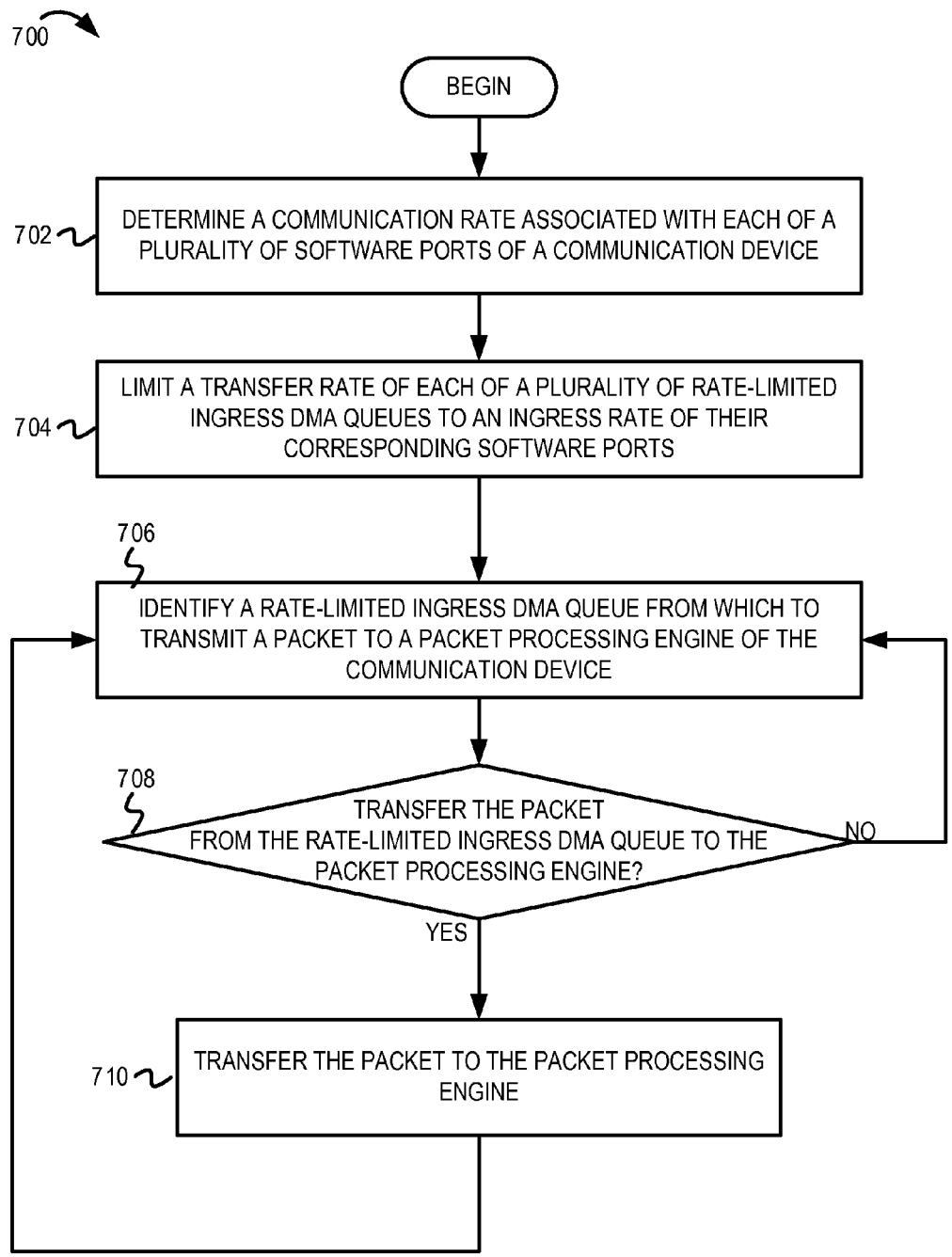
FIG. 7 is a flow diagram illustrating example operations of a communication device comprising multiple rate-limited ingress DMA queues.

FIG. 7 is a flow diagram 700 illustrating example operations of a communication device comprising multiple rate-limited ingress DMA queues. The flow 700 begins at block 702.

At block 702, a communication rate associated with each software port of a communication device is determined. With reference to the example of FIG. 2, the CPU 104 can determine the communication rate associated with each software port 102A, 102B . . . 102N of the communication device. It is noted that the communication rate can include various performance metrics. For example, the communication rate can comprise a bits per second (bps) throughput, a number of packets processed per second (PPS), packets transferred per second, and/or other suitable performance metrics (e.g., transactions per second (t/s)). The flow continues at block 704.

At block 704, a transfer rate of each of a plurality of rate-limited ingress DMA queues is limited to the ingress rates of their corresponding software ports. In some embodiments, each of the software ports 102 can be associated with one corresponding rate-limited ingress DMA queue 218 (e.g., when N=P). The rate limiters associated with each of the ingress DMA queues 218 can be configured to limit the communication rate of their respective ingress DMA queues to the communication rate of the associated software port. For example, the rate limiter associated with the ingress DMA queue 218A can be configured to limit the transfer rate of the ingress DMA queue 218A to the communication rate of the corresponding software port 102A. Specifically, as described above with reference to FIG. 2, the rate limiter can ensure that a packet of the ingress DMA queue 218A is transferred at a communication rate that is at least equal to the ingress communication rate of the corresponding software port 102A and that is within the designed communication rate limits of the packet processing engine 110. In embodiments where multiple rate-limited ingress DMA queues operate in parallel, the ingress DMA scheduler 220 can determine the order in which packets from said each of the multiple rate-limited ingress DMA queues are transferred to the packet processing engine 110. The flow continues at block 706.

At block 706, a rate-limited ingress DMA queue from which to transfer a packet to the packet processing engine is identified. With reference to the example of FIG. 2, the ingress DMA scheduler 220 can identify the rate-limited ingress DMA queue 218A from which to transfer a packet to the packet processing engine 110. In some embodiments, the ingress DMA scheduler 220 can identify the rate-limited ingress DMA queue 218A based on priority. In other embodiments, the ingress DMA scheduler 220 can identify the rate-limited ingress DMA queue 218A based on other suitable factors (e.g., a round-robin manner). It is noted (as described above with reference to FIG. 2) that multiple rate-limited ingress DMA queues may operate in parallel. An ingress DMA scheduler 220 may determine the order in which packets are transferred from the ingress DMA unit 212 to the packet processing engine 110. The flow continues at block 708.

At block 708, it is determined whether the packet should be transferred from the rate-limited ingress DMA queue to the packet processing engine. With reference to the example of FIGS. 3-5, the rate limiter 300 associated with the rate-limited ingress DMA queue 218A may determine whether the queued packet in the rate-limited ingress DMA queue 218A satisfies the configured rate-limit constraints. The rate limiter 300 may check one or more conditions (described above in FIG. 3) and may determine that the queued packet can be transferred to the packet processing engine 110 only if all conditions are satisfied. With reference to the example of FIG. 3, the rate limiter 300 may indicate that the queued packet can be transferred to the packet processing engine 110 if there is a queued packet available for transfer to the packet processing engine 110, the ingress DMA unit 212 is not currently transferring another packet, transmitting the packet will not cause a throughput threshold to be exceeded, and transmitting the packet will not cause a PPS threshold to be exceeded. In some embodiments, the rate limiter 300 may transmit a start transmission signal 316 to the ingress DMA scheduler 220 indicating the queued packet may be transferred (or DMA'd) to the packet processing engine 110. If it is determined that the packet should be provided to the packet processing engine 110, the flow continues at block 710. Otherwise, the flow continues at block 706.

At block 710, the packet is DMA'd to the packet processing engine. As described above, the packet processing engine 110 may also determine the subsequent route of the packet and an egress port for the packet. The packet processing engine 110 can determine the egress port based on availability of software ports, a processing unit associated with the software ports, a priority of the packet, and/or other suitable factors. The packet processing engine 110 can then forward the packet to the appropriate egress port to transmission to another network device. From block 710, the flow loops back to block 706, where a next rate limited ingress DMA queue is identified and analyzed. In some embodiments, the ingress DMA scheduler 220 can identify the next rate-limited ingress DMA queue 218B from which to transmit a packet based on priority, in a round-robin manner, or based on other suitable factors.

It is noted that although not depicted in FIG. 7, operations for receiving a packet at a software port, pre-processing the received packet, and providing the packet to an appropriate rate-limited ingress DMA queue of the ingress DMA unit 212 can be executed as described above with reference to FIG. 2.

It should be understood that FIGS. 1-7 and the operations described herein are examples meant to aid in understanding embodiments and should not be used to limit embodiments or limit scope of the claims. Embodiments may perform additional operations, fewer operations, operations in a different order, operations in parallel, and some operations differently. As discussed above, the packet processing engine 110 can determine the egress port from which a packet (e.g., previously received at a software port or a hardware port) should be transmitted. In some embodiments, packets received at one ingress port may be destined for multiple egress ports. In some embodiments, packets received at multiple ingress ports may all be destined for the same egress port. For example, packets received from each of the M hardware ports 116 may all be destined for the software port 102A. If the packets ("outgoing packets") are provided to the software port 102A at a communication rate that is higher than what the software port 102A can handle, one or more of the outgoing packets may be dropped at the software port 102A. The packets may be dropped after generating an interrupt for the CPU 104 (e.g., for each packet egressing to a software port). This can lead to an unnecessary load imposed on the CPU 104, as the packet will be dropped at the software port. For example, multiple outgoing packets may be destined for a 1 Gbps WLAN software port. If the outgoing packets are provided to the WLAN software port at a rate that is greater than 1 Gbps, the WLAN software port may drop (i.e., may not transmit or may discard) one or more of the outgoing packets.

In some embodiments, similar to the ingress DMA unit 112 of FIG. 1, the egress DMA unit 114 can implement a single egress DMA queue and a single egress rate limiter to ensure that packets are provided to the software ports at a communication rate that is at least equal to the communication rate associated with the software port and that takes into consideration the available capacity of the software port and the CPU 104. For example, the rate limiter unit can be configured so that the egress DMA unit 114 fetches and provides packets to the CPU 104 based on the processing speed and current workload of the CPU 104. In another embodiment, similar to the ingress DMA unit 212 of FIG. 2, the egress DMA unit 214 can implement multiple rate-limited egress DMA queues associated with corresponding multiple software ports. Each of the rate-limited egress DMA queues can ensure that packets are provided to the corresponding software port at a rate that takes into consideration the available capacity of the software port and the CPU 104. It should also be noted that the rate-limiting technique implemented at the ingress DMA unit may or may not match the rate-limiting technique implemented at the egress DMA unit. For example, the ingress DMA unit may implement a single ingress DMA queue and a single rate limiter as depicted in FIG. 1 while the egress DMA unit may implement multiple rate-limited egress DMA queues. As another example, the ingress DMA unit and the egress DMA unit may each implement their respective multiple rate-limited DMA queues.

In some embodiments, the packet processing engine 110 may classify outgoing packets into a plurality of output queues, for example, based on the priority of the outgoing packet, the processor used to process the queue, egress-port, and/or other suitable factors. In some embodiments, the packet processing engine 110 may fragment a received packet and may determine to transmit each of the packet fragments via a different egress port. In some embodiments, the packet processing engine 110 may determine to transmit packets belonging to different data streams from different egress ports, even if the packets are destined for the same destination device.

In some embodiments, the number of rate-limited egress DMA queues may be equal to the number of software ports, that is, each rate-limited egress DMA queue may be mapped to an associated software port. In other embodiments, however, the number of rate-limited egress DMA queues may be less than the number of software ports. In this embodiment, a rate-limited egress DMA queue may be mapped to multiple software ports based on capacity, priority, other suitable packet characteristics, and/or suitable software port characteristics. For example, the communication device 100 may comprise four software ports and two rate-limited egress DMA queues. In this example, the first rate-limited egress DMA queue can be mapped to the first software port with the highest priority level; while the second rate-limited egress DMA queue can be mapped to the second, third, and fourth software ports with lower priority levels.

Although FIG. 2 depicts the ingress DMA unit 212 comprising a rate-limited ingress DMA queue for each software port of the communication device 200, embodiments are not so limited. In some embodiments, two or more software ports may share a rate-limited ingress DMA queue. For example, the software ports 102A and 102B may share a single rate-limited ingress DMA queue, while the software port 102N may have a dedicated rate-limited ingress DMA queue. In some embodiments, the ingress DMA unit 212 may comprise multiple rate-limited ingress DMA queues that are shared by all of the software ports 102. Each of the multiple rate-limited ingress DMA queues may be associated with a different priority level, packet size, and/or other packet characteristic. For example, if DMA queue 1 is associated with priority level 1 and DMA queue 2 is associated with priority level 2, packets with priority level 1 (received at any of the software ports 102) can be stored in the DMA queue 1.

If the communication device 100 comprises multiple CPUs, each of the CPUs may be configured to process packets belonging to one or more software-ports, priorities and consequently DMA queues. For example, CPU 1 may be configured to process packets belonging to DMA queue 1, while CPU 2 may be configured to process packets belonging to DMA queues 2 and 3. As another example, each of the rate-limited DMA queues may have their respective dedicated CPU.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
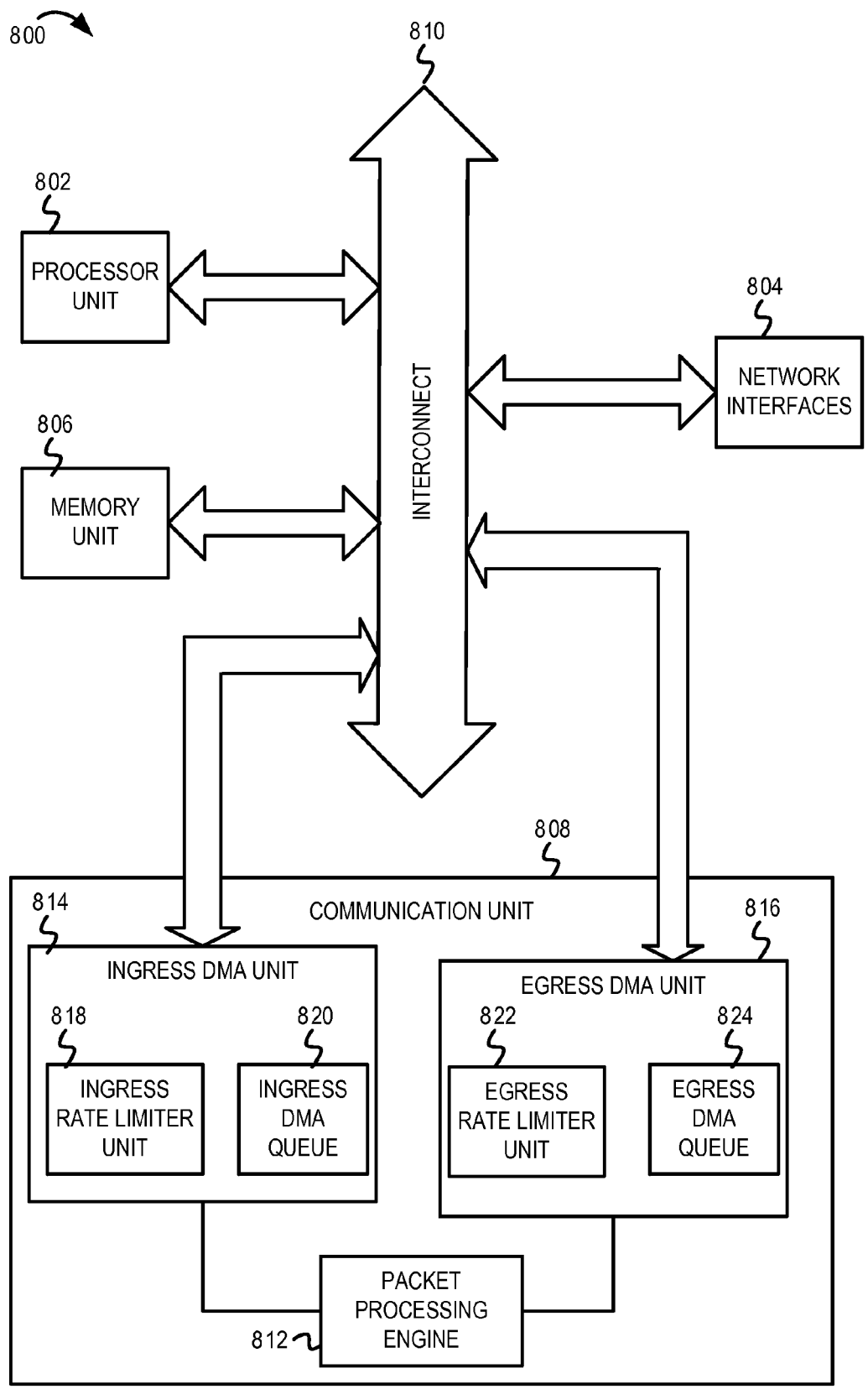
FIG. 8 is a block diagram of one embodiment of an electronic device including a DMA rate-limiting mechanism.

FIG. 8 is a block diagram of one embodiment of an electronic device 800 including a DMA rate-limiting mechanism. In some embodiments, the electronic device 800 can be a laptop computer, a tablet computer, a netbook, a mobile phone, a smart appliance, a gaming console, a desktop computer, a powerline communication device, a network bridge device, or other suitable electronic device configured to implement one or more communication protocols or access technologies. The electronic device 800 includes a processor unit 802 (possibly including multiple processors, multiple cores, multiple nodes, and/or implementing multi-threading, etc.). The electronic device 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media. The electronic device 800 also includes an interconnect 810 (e.g., PCI, ISA, PCI-Express, HyperTransport®, InfiniBand®, NuBus, AHB, AXI, etc.), and network interfaces 804 that include at least one of a wireless network interface (e.g., a WLAN interface, a Bluetooth® interface, a WiMAX interface, a ZigBee® interface, a Wireless USB interface, etc.) and/or a wired network interface (e.g., a powerline communication interface, an Ethernet interface, etc.). In some embodiments, the electronic device 800 can comprise a plurality of network interfaces (e.g., a PLC interface, an Ethernet interface, and a WLAN interface) that connect the electronic device 800 to a corresponding communication network (e.g., a powerline network segment, an Ethernet segment, and a WLAN segment respectively).

The electronic device 800 also includes a communication unit 808. The communication unit 808 comprises a packet processing engine 812, an ingress DMA unit 814, and an egress DMA unit 816. The ingress DMA unit 814 and the egress DMA unit 816 are each coupled to the interconnect

810. The ingress DMA unit 814 and the egress DMA unit 816 are coupled with the packet processing ending 812. The ingress DMA unit 804 comprises at least one ingress DMA queue 820, and at least one ingress rate limiter unit 818. The egress DMA unit 816 comprises egress DMA queue 824, and at least egress one rate limiter unit 822. In some embodiments, the ingress DMA unit 814 and the egress DMA unit 816 may also comprise an ingress DMA scheduler and an egress DMA scheduler respectively. In one example as depicted with reference to FIG. 1, the ingress DMA unit 814 and the egress DMA unit 816 can each comprise a single DMA queue and a single rate limiter across all the software ports of the electronic device 800. In other embodiments, as depicted with reference to FIG. 2, the ingress DMA unit 814 and the egress DMA unit 816 can each comprise multiple DMA queues and rate limiters associated with corresponding ones of multiple software ports of the electronic device 800. In some embodiments, the processor unit 802 can execute functionality as described above in FIGS. 1-6 to configure the ingress DMA unit 814 to limit its transfer rate to an aggregate software port ingress rate. The ingress DMA unit 814 can execute functionality described above in FIGS. 1-6 to ensure that the transfer rate at which packets (received from software ports of the electronic device 800) are transferred to the packet processing engine 812 does not exceed the designed communication rate limits of the packet processing engine 812. The egress DMA unit 816 can also execute functionality to ensure that the packets are provided to the processor unit 802 for processing and to the software ports for transmission in accordance with the available capacity and workload of the processor unit 802 and the software ports.

Any one of these functionalities may be partially (or entirely) implemented in hardware and/or on the processor unit 802. For example, the functionality may be implemented with an application specific integrated circuit, in logic implemented in the processor unit 802, in a co-processor on a peripheral device or card, etc. Further, realizations may include fewer or additional components not illustrated in FIG. 8 (e.g., video cards, audio cards, additional network interfaces, additional processor units, the packet processing engine, one or more hardware ports, one or more software ports, peripheral devices, etc.). For example, the DMA unit 808 may comprise one or more additional processors (e.g., embedded processors) that are distinct from the processor unit 802 coupled with the interconnect 810. The processor unit 802, the memory unit 806, and the network interfaces 804 are coupled to the interconnect 810. Although illustrated as being coupled to the interconnect 810, the memory unit 806 may be coupled to the processor unit 802.

While the embodiments are described with reference to various implementations and exploitations, it will be understood that these embodiments are illustrative and that the scope of the inventive subject matter is not limited to them. In general, DMA rate-limiting techniques as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for providing packets to a packet processing engine via an ingress direct memory access (DMA) unit of a communication device, the method comprising:
   determining communication rates of a plurality of software ports of the communication device;
   determining an aggregate software port ingress rate of the communication device based, at least in part, on the communication rates of the plurality of software ports; and
   providing, by the ingress DMA unit, the packets received from at least a subset of the plurality of software ports to the packet processing engine at a transfer rate that is at least equal to the aggregate software port ingress rate and that does not exceed a maximum communication rate of the packet processing engine.

2. The method of claim 1, wherein
   the communication device comprises a plurality of hardware ports, and
   the plurality of software ports and the plurality of hardware ports share the packet processing engine.

3. The method of claim 1, wherein the transfer rate of the ingress DMA unit comprises at least one member selected from the group consisting of a bits per second throughput associated with the ingress DMA unit and a number of packets transferred per second by the ingress DMA unit.

4. The method of claim 1, further comprising configuring the ingress DMA unit to limit the transfer rate for providing packets to the packet processing engine to a rate between the aggregate software port ingress rate and the maximum communication rate of the packet processing engine.

5. The method of claim 1, wherein the communication device comprises one or more processors configured to pre-process packets received at the plurality of software ports.

6. The method of claim 1, wherein the ingress DMA unit comprises a plurality of ingress DMA queues, wherein each of the plurality of ingress DMA queues corresponds to one or more of the plurality of software ports.

7. The method of claim 1, wherein the ingress DMA unit comprises a plurality of ingress DMA queues, wherein each of the plurality of software ports maps to at least one of the plurality of ingress DMA queues.

8. The method of claim 1, wherein the ingress DMA unit comprises one or more ingress DMA queues associated with the plurality of software ports, and wherein said providing, by the ingress DMA unit, the packets received from at least the subset of the plurality of software ports to the packet processing engine comprises, for a first ingress DMA queue of the one or more ingress DMA queues,
   providing, from the first ingress DMA queue, packets received from a first software port to the packet processing engine at a transfer rate that is at least equal to a communication rate associated with the first software port.

9. The method of claim 1, further comprising determining the maximum communication rate of the packet processing engine based, at least in part, on the aggregate software port ingress rate and an aggregate hardware port ingress rate.

10. The method of claim 1, wherein the ingress DMA unit comprises one or more ingress DMA queues associated with the plurality of software ports, the method further comprising:

for a rate limiter associated with a first ingress DMA queue of the one or more ingress DMA queues,
configuring a communication rate of the rate limiter to be at least equal to a communication rate of a first software port associated with the first ingress DMA queue and less than the maximum communication rate of the packet processing engine.

11. The method of claim 1, wherein
a communication rate associated with a first software port of the plurality of software ports is a peak ingress communication rate of the first software port; and
a communication rate associated with a first hardware port of one or more hardware ports of the communication device is a peak ingress communication rate of the first hardware port.

12. The method of claim 1, wherein the maximum communication rate of the packet processing engine comprises at least one member selected from the group consisting of a predefined bits per second throughput of the packet processing engine and a predefined packets per second throughput of the packet processing engine.

13. The method of claim 1, wherein if the ingress DMA unit comprises one or more ingress DMA queues associated with the plurality of software ports, the method further comprising:
determining, at the ingress DMA unit, whether to provide a packet from a first ingress DMA queue to the packet processing engine based, at least in part, on determining whether providing the packet to the packet processing engine will exceed the maximum communication rate of the packet processing engine.

14. The method of claim 13, wherein said determining whether providing the packet to the packet processing engine will exceed the maximum communication rate of the packet processing engine comprises at least one member selected from the group consisting of:
determining whether providing the packet to the packet processing engine will cause the packet processing engine to exceed a predefined bits per second throughput threshold; and
determining whether providing the packet to the packet processing engine will cause the packet processing engine to exceed a predefined packets processed per second threshold.

15. The method of claim 1, further comprising:
determining an aggregate hardware port ingress rate of the communication device based, at least in part, on a sum of communication rates of a plurality of hardware ports of the communication device; and
determining the maximum communication rate of the packet processing engine based, at least in part, on a sum of the aggregate software port ingress rate and the aggregate hardware port ingress rate.

16. The method of claim 1, wherein the aggregate software port ingress rate of the communication device comprises a sum of the communication rates of the plurality of software ports.

17. The method of claim 1, further comprising
receiving a packet in a first packet format at a first software port of the plurality of software ports;
converting the packet from the first packet format into a second packet format supported by the packet processing engine; and
providing the packet in the second packet format to the ingress DMA unit for subsequent transfer to the packet processing engine.

18. The method of claim 17, wherein said providing the packet in the second packet format to the ingress DMA unit comprises:
providing the packet to a first ingress DMA queue of the ingress DMA unit, wherein the first ingress DMA queue is associated with the first software port.

19. The method of claim 17, wherein the first packet format is a wireless local area network (WLAN) packet format or a universal serial bus (USB) packet format.

20. The method of claim 17, wherein the second packet format is an Ethernet packet format.

21. The method of claim 1, further comprising:
determining to transmit a packet, from the packet processing engine to an egress DMA unit of the communication device based, at least in part, on a transmission priority of the packet; and
determining to transmit the packet from the egress DMA unit to a first software port of the plurality of software ports based, at least in part, on a communication rate associated with the first software port.

22. The method of claim 21,
wherein the egress DMA unit comprises one or more rate-limited egress DMA queues associated with of the plurality of software ports,
wherein said transmitting the packet to the egress DMA unit comprises transmitting the packet to a first egress DMA queue of the one or more rate-limited egress DMA queues that is associated with the first software port of the plurality of software ports, and
wherein the first egress DMA queue is configured to provide the packet to the first software port at a rate that does not exceed the communication rate associated with the first software port.

23. The method of claim 21,
wherein the egress DMA unit comprises one or more egress DMA queues associated with the plurality of software ports; and
wherein each of the one or more egress DMA queues is configured to receive packets from the packet processing engine based, at least in part, on transmission priorities associated with the packets.

24. A communication device comprising:
a packet processing engine;
a plurality of software ports;
an ingress direct memory access (DMA) unit coupled with the packet processing engine and the plurality of software ports, the ingress DMA unit operable to provide packets to the packet processing engine; and
a processor coupled with the ingress DMA unit and the plurality of software ports, the processor operable to:
determine communication rates of the plurality of software ports;
determine an aggregate software port ingress rate of the communication device based, at least in part, on the communication rates of the plurality of software ports,
wherein the ingress DMA unit is further operable to provide the packets received from at least a subset of the plurality of software ports to the packet processing engine at a transfer rate that is at least equal to the aggregate software port ingress rate and that does not exceed a maximum communication rate of the packet processing engine.

25. The communication device of claim 24, wherein the transfer rate of the ingress DMA unit comprises at least one member selected from the group consisting of a bits per second throughput associated with the ingress DMA unit and a number of packets transferred per second by the ingress DMA unit.

26. The communication device of claim 24, wherein the processor is further operable to configure the ingress DMA unit to limit the transfer rate for providing packets to the packet processing engine to a rate between the aggregate software port ingress rate and the maximum communication rate of the packet processing engine.

27. The communication device of claim 24, wherein the ingress DMA unit comprises one or more ingress DMA queues associated with the plurality of software ports, and wherein the ingress DMA unit operable to provide the packets received from at least the subset of the plurality of software ports to the packet processing engine comprises the ingress DMA unit operable to:
for a first ingress DMA queue of the one or more ingress DMA queues,
provide, from the first ingress DMA queue, packets received from a first software port to the packet processing engine at a transfer rate that is at least equal to a communication rate associated with the first software port.

28. The communication device of claim 24, wherein the ingress DMA unit comprises one or more ingress DMA queues associated with the plurality of software ports, and wherein the communication device further comprises:
a rate limiter associated with a first ingress DMA queue of the one or more ingress DMA queues, wherein the processor is operable to configure a communication rate of the rate limiter to be at least equal to a communication rate of a first software port associated with the first ingress DMA queue and less than the maximum communication rate of the packet processing engine.

29. The communication device of claim 24, wherein the maximum communication rate of the packet processing engine is a design capacity of the packet processing engine, wherein the design capacity of the packet processing engine comprises at least one member selected from the group consisting of a predefined bits per second throughput of the packet processing engine and a predefined packets per second throughput of the packet processing engine.

30. The communication device of claim 24, wherein the processor is further operable to:
determine an aggregate hardware port ingress rate of the communication device based, at least in part, on a sum of communication rates of a plurality of hardware ports of the communication device; and
determine the maximum communication rate of the packet processing engine based, at least in part, on a sum of the aggregate software port ingress rate and the aggregate hardware port ingress rate.

31. The communication device of claim 24, wherein a first software port of the plurality of software ports is operable to:
receive a packet in a first packet format; and
the processor is operable to:
convert the packet from the first packet format into a second packet format supported by the packet processing engine; and
provide the packet in the second packet format to the ingress DMA unit for subsequent transmission to the packet processing engine.

32. The communication device of claim 24, wherein, the packet processing engine is further operable to:
determine to transmit a packet to an egress DMA unit of the communication device based, at least in part, on a transmission priority of the packet; and the egress DMA unit is operable to:
determine to transmit the packet from the egress DMA unit to first software port of the plurality of software ports based, at least in part, on a communication rate associated with the first software port.

33. A non-transitory machine-readable storage medium having instructions stored therein, which when executed by one or more processors causes the one or more processors to perform operations that comprise:
determining communication rates of a plurality of software ports of a communication device;
determining an aggregate software port ingress rate of the communication device based, at least in part, on communication rates of the plurality of software ports; and
providing, by an ingress direct memory access (DMA) unit, packets received from at least a subset of the plurality of software ports to a packet processing engine at a transfer rate that is at least equal to the aggregate software port ingress rate and that does not exceed a maximum communication rate of the packet processing engine.

34. The non-transitory machine-readable storage medium of claim 33, wherein the operations further comprise:
determining the maximum communication rate of the packet processing engine, and
configuring the ingress DMA unit to limit the transfer rate for providing packets to the packet processing engine to a rate between the aggregate software port ingress rate and the maximum communication rate of the packet processing engine.

35. The non-transitory machine-readable storage medium of claim 33, wherein the ingress DMA unit comprises one or more ingress DMA queues associated with the plurality of software ports, and wherein providing, by the ingress DMA unit, the packets received from at least the subset of the plurality of software ports to the packet processing engine comprises,
for a first ingress DMA queue of the one or more ingress DMA queues,
providing, from the first ingress DMA queue, packets received from a first software port to the packet processing engine at a transfer rate that is at least equal to a communication rate associated with the first software port.

36. The non-transitory machine-readable storage medium of claim 33, wherein the operations further comprise:
determining an aggregate hardware port ingress rate of the communication device based, at least in part, on a sum of communication rates of a plurality of hardware ports of the communication device; and
determining the maximum communication rate of the packet processing engine based, at least in part, on a sum of the aggregate software port ingress rate and the aggregate hardware port ingress rate.

37. The non-transitory machine-readable storage medium of claim 33, wherein the operations further comprise:
determining to transmit a packet, from the packet processing engine to an egress DMA unit of the communication device based, at least in part, on a transmission priority of the packet; and
determining to transmit the packet from the egress DMA unit to a first software port of the plurality of software ports based, at least in part, on a communication rate associated with the first software port.

* * * * *